(12) United States Patent
Tatsuwaki et al.

(10) Patent No.: US 11,813,935 B2
(45) Date of Patent: Nov. 14, 2023

(54) VEHICLE BODY STRUCTURE

(71) Applicant: Honda Motor Co., Ltd., Tokyo (JP)

(72) Inventors: Masaaki Tatsuwaki, Saitama (JP); Ken Yasui, Saitama (JP); Satoru Kawabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 17/510,344

(22) Filed: Oct. 25, 2021

(65) Prior Publication Data
US 2022/0144063 A1 May 12, 2022

(30) Foreign Application Priority Data

Nov. 11, 2020 (JP) ................................. 2020-187930

(51) Int. Cl.
*B60K 1/04* (2019.01)
*B62D 21/15* (2006.01)
*B60L 50/60* (2019.01)

(52) U.S. Cl.
CPC ................ *B60K 1/04* (2013.01); *B60L 50/66* (2019.02); *B62D 21/157* (2013.01); *B60K 2001/0438* (2013.01); *B60Y 2306/01* (2013.01)

(58) Field of Classification Search
CPC ... B60K 1/04; B60K 2001/0438; B60L 50/66; B60L 50/64; H01M 50/204; H01M 50/249; B62D 25/20; B62D 25/2009
See application file for complete search history.

(56) References Cited

U.S. PATENT DOCUMENTS

| | | | | |
|---|---|---|---|---|
| 6,227,322 | B1 * | 5/2001 | Nishikawa | ............. B60R 16/04 180/68.5 |
| 7,500,714 | B2 * | 3/2009 | Abe | ................... B62D 25/2036 296/193.07 |
| 7,610,978 | B2 * | 11/2009 | Takasaki | ................ B62D 25/20 429/96 |

(Continued)

FOREIGN PATENT DOCUMENTS

| | | |
|---|---|---|
| CN | 108454371 | 8/2018 |
| CN | 110588799 | 12/2019 |

(Continued)

OTHER PUBLICATIONS

"Office Action of Japan Counterpart Application", dated Aug. 29, 2023, with English translation thereof, pp. 1-12.
(Continued)

*Primary Examiner* — Jason D Shanske
*Assistant Examiner* — James J Triggs
(74) *Attorney, Agent, or Firm* — JCIPRNET

(57) ABSTRACT

A vehicle body structure includes: a second floor cross member and a third floor cross member in which one end in a vehicle width direction is connected to a side sill; a battery arranged below the second floor cross member and the third floor cross member; a battery case which stores the battery and in which one end in the vehicle width direction is connected via a right frame and a left frame; cross member bent portions formed on the second floor cross member and the third floor cross member; and frame bent portions formed on the right frame and the left frame. The cross member bent portions and the frame bent portions are arranged side by side in an up-down direction.

20 Claims, 15 Drawing Sheets

(56) References Cited

U.S. PATENT DOCUMENTS

| | | | | |
|---|---|---|---|---|
| 8,079,435 | B2 * | 12/2011 | Takasaki | H01M 50/202 |
| | | | | 180/68.5 |
| 8,863,878 | B2 * | 10/2014 | Shirooka | B60K 1/04 |
| | | | | 180/68.5 |
| 9,022,152 | B2 * | 5/2015 | Imamura | B62D 21/157 |
| | | | | 180/68.5 |
| 10,464,406 | B2 | 11/2019 | Kawabe et al. | |
| 10,720,620 | B1 * | 7/2020 | Grace | H01M 50/244 |
| 10,773,583 | B2 * | 9/2020 | Fukui | B60K 1/04 |
| 10,967,908 | B2 | 4/2021 | Tsuyuzaki et al. | |
| 11,370,287 | B2 | 6/2022 | Tsuyuzaki et al. | |
| 11,634,002 | B2 * | 4/2023 | Noh | B62D 21/02 |
| | | | | 280/124.128 |
| 2005/0189791 | A1 * | 9/2005 | Chernoff | B62D 25/2036 |
| | | | | 296/193.07 |
| 2005/0194818 | A1 * | 9/2005 | Odaka | B62D 21/157 |
| | | | | 296/187.12 |
| 2020/0262491 | A1 | 8/2020 | Shannon et al. | |

FOREIGN PATENT DOCUMENTS

| | | |
|---|---|---|
| CN | 110636968 | 12/2019 |
| JP | H05139341 | 6/1993 |
| JP | H07117489 | 5/1995 |
| JP | 3132261 | 2/2001 |
| JP | 2008174181 | 7/2008 |
| JP | 2017088077 | 5/2017 |
| JP | 2018188086 | 11/2018 |
| JP | 6593657 | 10/2019 |
| JP | 2020097350 | 6/2020 |

OTHER PUBLICATIONS

"Office Action of China Counterpart Application", dated Aug. 17, 2023, with English translation thereof, pp. 1-14.

* cited by examiner

VEHICLE BODY STRUCTURE

CROSS-REFERENCE TO RELATED APPLICATION

This application claims the priority benefit of Japan application serial no. 2020-187930, filed on Nov. 11, 2020. The entirety of the above-mentioned patent application is hereby incorporated by reference herein and made a part of this specification.

BACKGROUND

Technical Field

The disclosure relates to a vehicle body structure.

Related Art

Conventionally, there has been known a vehicle in which a battery pack is mounted below a floor panel, a plurality of batteries being stored side by side in a battery case (battery pack frame) in the battery pack. In this vehicle, in order to prevent damage to the battery pack caused by a side collision to a side portion of a vehicle body in a vehicle width direction, a technique for crushing a side sill and absorbing a load caused by the side collision with the side sill has been disclosed (for example, see Patent literature 1: Japanese Patent No. 6593657).

In addition, a technique has been disclosed in which an easily crushed portion is arranged on a side portion of a battery case in a vehicle width direction, and a load caused by a side collision is absorbed by crushing and deforming the easily crushed portion (for example, see Patent literature 2: Japanese Patent No. 3132261).

However, in Patent literature 1 described above, the battery case itself needs to have a mechanical strength necessary to crush the side sill caused by the side collision. In order to secure the mechanical strength, the battery case may become larger or heavier.

In addition, in Patent literature 2, it is necessary to secure a sufficient space (a deformation stroke region in the vehicle width direction) for crushing and deforming the easily crushed portion. Therefore, the vehicle width direction of the vehicle body may become large.

SUMMARY

The disclosure proposes the following solutions.

(1) A vehicle body structure according to the disclosure includes: a floor cross member (for example, a second floor cross member 45 and a third floor cross member 46 in an embodiment) which extends along a vehicle width direction of a vehicle body (for example, a vehicle body 10 in the embodiment) and in which one end (for example, right end portions 45*a* and 46*a* and left end portions 45*c* and 46*c* in the embodiment) in the vehicle width direction is connected to a side portion of the vehicle body in the vehicle width direction; a battery (for example, a battery 85 in the embodiment) arranged below the floor cross member; a battery case (for example, a battery case 81 in the embodiment) which stores the battery and in which one end (for example, a second right outer frame body 103*b* and a second left outer frame body 104*b* in the embodiment) in the vehicle width direction is connected via a side frame (for example, a right frame 103 and a left frame 104 in the embodiment) at the side portion of the vehicle body in the vehicle width direction and below the floor cross member; a first bent portion (for example, cross member bent portions 45*i* and 46*i* in the embodiment) formed on a side of the one end of the floor cross member and bent inclinedly in an up-down direction from a first horizontal portion (for example, cross member horizontal portions 45*e* and 46*e* in the embodiment) extending along the vehicle width direction toward an outer side in the vehicle width direction; and a second bent portion (for example, frame bent portions 103*g* and 104*g* in the embodiment) formed on the side frame and bent inclinedly in the up-down direction from a second horizontal portion (for example, frame horizontal portions 103*f* and 104*f* in the embodiment) extending along the vehicle width direction toward the outer side in the vehicle width direction. The first bent portion and the second bent portion are arranged side by side in the up-down direction (aligned in the vehicle width direction).

With this configuration, at the time of a side collision, the floor cross member is bent starting from the first bent portion, and the side frame is bent starting from the second bent portion. The floor cross member and the side frame are crushed while being bent, and thereby a load caused by the side collision is absorbed. In this way, because a load direction of the side collision is distributed to bending directions of the floor cross member and the side frame and the load caused by the side collision is absorbed, damage to the battery can be prevented even if the mechanical strength of the battery case is reduced as compared with before. Particularly, the side frame is bent starting from the second bent portion and an impact energy is absorbed. As a result, the mechanical strength of the side sill and the side frame can be reduced and the weight can be reduced by, for example, reducing a plate thickness or eliminating a reinforcing member.

(2) In the above configuration, the floor cross member may be formed in a closed cross section (for example, a cross member inclined closed cross section 47 in the embodiment), extend inclinedly downward as a cross-sectional area is gradually reduced from the first bent portion toward the outer side in the vehicle width direction, and be fixed to a floor panel (for example, a floor panel 23 in the embodiment) and a side sill (for example, a side sill 31 in the embodiment) of the vehicle body arranged below the floor cross member. The vehicle body structure may include a gusset (for example, an inclined member 48 in the embodiment) arranged in a manner of straddling an inner surface (for example, an inner panel 31*f* in the embodiment) of an inner side of the side sill in the vehicle width direction and a lower surface (for example, lower surfaces 45*h* and 46*h* in the embodiment) of the floor cross member. The gusset may be formed with an incline in a manner that an upper end (for example, an upper end 48*b* in the embodiment) corresponds to the shape of the floor cross member on the outer side in the vehicle width direction from the first bent portion, and cooperate with the floor cross member to sandwich an outer portion (for example, a right end portion 33*a* and a left end portion 34*a* in the embodiment) of the floor panel in the vehicle width direction from the up-down direction.

With this configuration, the floor panel is set high in the up-down direction up to an upper end of the side sill, and thereby a large battery case can be mounted downward. In addition, because the floor cross member extends inclinedly downward as the cross-sectional area is gradually reduced from the first bent portion toward the outer side in the vehicle width direction, an end portion of the floor cross member in the vehicle width direction can be bent downward in a stable manner at the time of a side collision. At this time, because an upper end of the gusset is formed with an incline, the gusset is shaped to sufficiently receive the load of the side collision and the gusset can be easily crushed. As a result, the load caused by the side collision can be sufficiently absorbed by the floor cross member or the gusset.

(3) In the above configuration, the floor cross member may have a seat fixing portion (for example, seat fixing portions 45j and 46j in the embodiment) for fixing a seat arranged on the floor cross member, and the gusset may extend until the upper end of the gusset on a side of the floor cross member is directly below the seat fixing portion.

With this configuration, the strength of the seat fixing portion of the floor cross member can be sufficiently secured with slight reinforcement. In addition, the gusset can be made sufficiently large, and the load caused by the side collision can be sufficiently absorbed by the gusset. Particularly, the cross section is reduced from the vicinity of the first bent portion of the floor cross member, resulting in an insufficient seat support strength, but the lower gusset provides a sufficient seat support strength.

(4) In the above configuration, the floor cross member and the gusset may have a hat-shaped cross section along a front-rear direction and the up-down direction, a flange portion (for example, flange portions 45g and 46g in the embodiment) of the floor cross member in the front-rear direction and a flange portion (for example, a flange portion 48a in the embodiment) of the gusset in the front-rear direction may be overlapped to be coupled to each other, and the floor cross member and the gusset may form a trapezoidal shape when viewed from the front-rear direction.

With this configuration, the seat support strength of the floor cross member and the gusset can be sufficiently increased. On the other hand, the mechanical strength of the floor cross member and the gusset in a side collision direction is less likely to be secured. Therefore, the floor cross member and the gusset can be easily bent at the time of a side collision, and the load caused by the side collision can be sufficiently absorbed by the floor cross member and the gusset.

(5) In the above configuration, the side sill may be formed in a closed cross section, the vehicle body structure may include a bulkhead (for example, a bulkhead 164 in the embodiment) arranged on the outer side in the vehicle width direction in the side sill, and a lower portion of the bulkhead may be extended inward in the vehicle width direction and face the gusset in the vehicle width direction, and may be connected to the side frame of the battery case arranged on the side portion in the vehicle width direction.

With this configuration, the weight of the side sill can be reduced, and a sufficient mechanical strength of the side sill can be secured. In addition, the mechanical strength of the side sill can be secured, and the load applied to the side sill at the time of a side collision can be sufficiently transmitted to the gusset and the side frame. As a result, an end portion of the gusset or the side frame in the vehicle width direction can be easily crushed, and the load caused by the side collision can be sufficiently absorbed by the gusset or side frame.

(6) In the above configuration, the vehicle body structure may include a floor tunnel (for example, a floor tunnel 24 in the embodiment) that extends in the front-rear direction and a brace reinforcing portion (for example, a brace reinforcing portion 160 in the embodiment) arranged in the floor tunnel, the floor cross members may be arranged on two sides sandwiching the floor tunnel, and when viewed from the front-rear direction, the brace reinforcing portion may be arranged in a manner of coupling a root portion (for example, a flange portion 24e in the embodiment) of a left end of the floor tunnel to, on a right side, an end portion of the floor cross member on a center side in the vehicle width direction (for example, central end portions 45f and 46f in the embodiment), and coupling a root portion (for example, a flange portion 24e in the embodiment) of a right end of the floor tunnel to, on a left side, an end portion of the floor cross member on the center side in the vehicle width direction (for example, center end portions 45f and 46f in the embodiment).

With this configuration, the load applied to either a left or a right floor cross member at the time of a side collision can be linearly transmitted to the other floor cross member. Correspondingly, the entire floor cross member can receive the load caused by the side collision, and damage to the floor tunnel can also be suppressed.

(7) In the above configuration, the battery case may include an upper cross member (for example, an upper cross member 96 in the embodiment) that extends along the vehicle width direction and a lower cross member (for example, a lower cross member 93 in the embodiment) that extends along the vehicle width direction and is arranged below the upper cross member, and one cross member of the upper cross member and the lower cross member may protrude further outward than the other cross member in the vehicle width direction.

With this configuration, a deformation region (deformation stroke region) of the longer cross member that protrudes further outward in the vehicle width direction can absorb the load at the time of a side collision, and the shorter cross member can avoid an interference between a member that is crushed by the battery case side and the battery case. Therefore, the battery can be reliably protected at the time of a side collision.

(8) In the above configuration, the vehicle body structure may include a floor frame (for example, a first longitudinal frame 55, a second longitudinal frame 56, a third longitudinal frame 57, and a fourth longitudinal frame 58 in the embodiment) extending along the front-rear direction and coupled to the floor cross member, and the floor frame, the upper cross member, and the lower cross member may be connected in the up-down direction via a coupling member (for example, mounting bolts 125 and 146 in the embodiment).

With this configuration, the floor frame, the upper cross member, and the lower cross member can be integrated. Therefore, the arrangement of the floor frame, the upper cross member, and the lower cross member can be easily changed, and the workability of assembling to various vehicle bodies can be improved. In addition, the battery case can be shared with various vehicle bodies. Furthermore, because the floor frame, the upper cross member, and the lower cross member can be integrated, an impact resistance of the floor frame, the upper cross member, and the lower cross member at the time of a side collision can be improved.

(9) In the above configuration, there may be at least two rows in which a plurality of the batteries are arranged along the vehicle width direction, and the upper cross member and the lower cross member may be arranged between each row of the batteries.

With this configuration, it is possible to reliably suppress reception of the load at the time of a side collision by the upper cross member or the lower cross member and transmission of the impact to the battery. As a result, the battery case can be more reliably made smaller and lighter.

(10) In the above configuration, a plurality of the batteries may be arranged longitudinally with a longitudinal direction of the battery oriented along the front-rear direction to constitute a battery pack (for example, a battery pack 20 in the embodiment), and a gravity center position of the battery pack (for example, a center of gravity of pack Gi in the embodiment) may be located at the rear of a vehicle gravity center position of an entire vehicle (for example, a center of gravity of vehicle Gb in the embodiment).

With this configuration, a width of the battery pack in the vehicle width direction can be kept small. Thereby, for example, a deformation allowable space due to the load at the time of a side collision can be set large.

In addition, because the gravity center position of the battery pack is located at the rear of the vehicle gravity center position of the entire vehicle (including all parts of a vehicle such as a vehicle body, a motor, a battery, and the like), the load applied to the battery pack due to a side collision can be changed to a rotational moment.

In this way, by setting a large deformation allowable space and changing the load at the time of a side collision to a rotational moment, for example, it is possible to eliminate the need for reinforcement of the vehicle body, and thus the deformation of the battery pack can be suppressed without increasing the weight of the vehicle body.

DESCRIPTION OF THE EMBODIMENTS

Figure 1:
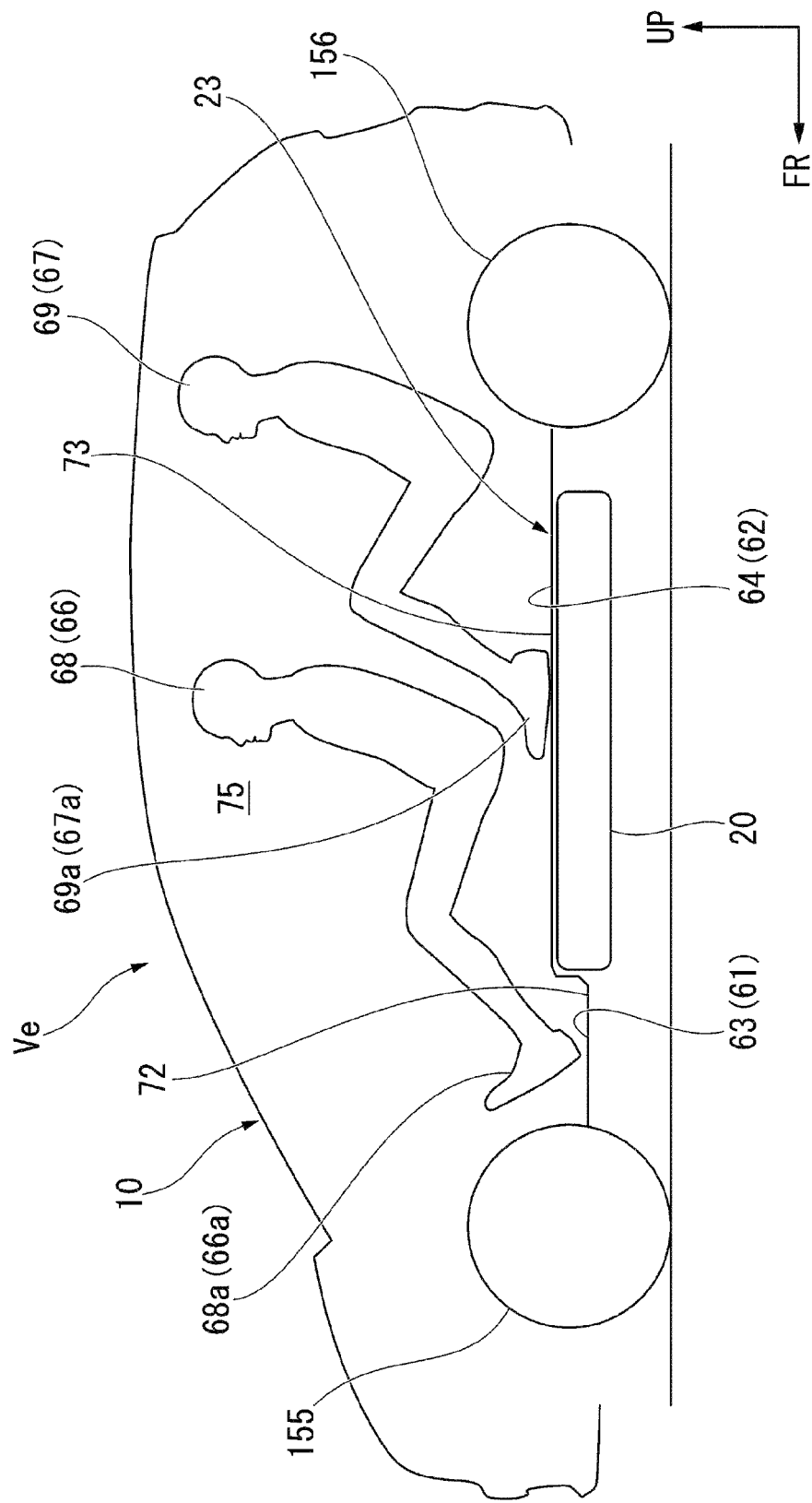
FIG. 1 is a schematic view of a vehicle equipped with a battery pack according to an embodiment of the disclosure as viewed from a left side.

The disclosure provides a vehicle body structure capable of suppressing an increase in a size of a vehicle body or an increase in a weight of the vehicle body. According to the disclosure, because a load direction of the side collision is distributed to bending directions of the floor cross member and the side frame and the load caused by the side collision is absorbed, damage to the battery can be prevented even if the mechanical strength of the battery case is reduced as compared with before. As a result, the vehicle body can be made smaller and lighter.

Hereinafter, a vehicle equipped with a battery pack having a vehicle body structure according to an embodiment of the disclosure is described with reference to the drawings. In the drawing, an arrow FR indicates a front side of the vehicle, an arrow UP indicates an upper side of the vehicle, and an arrow LH indicates a left side of the vehicle. In addition, the vehicle equipped with a battery pack has a substantially symmetrical configuration. Thus, hereinafter, left and right constituent members are described with the same reference signs.

<Vehicle Body>

Figure 2:
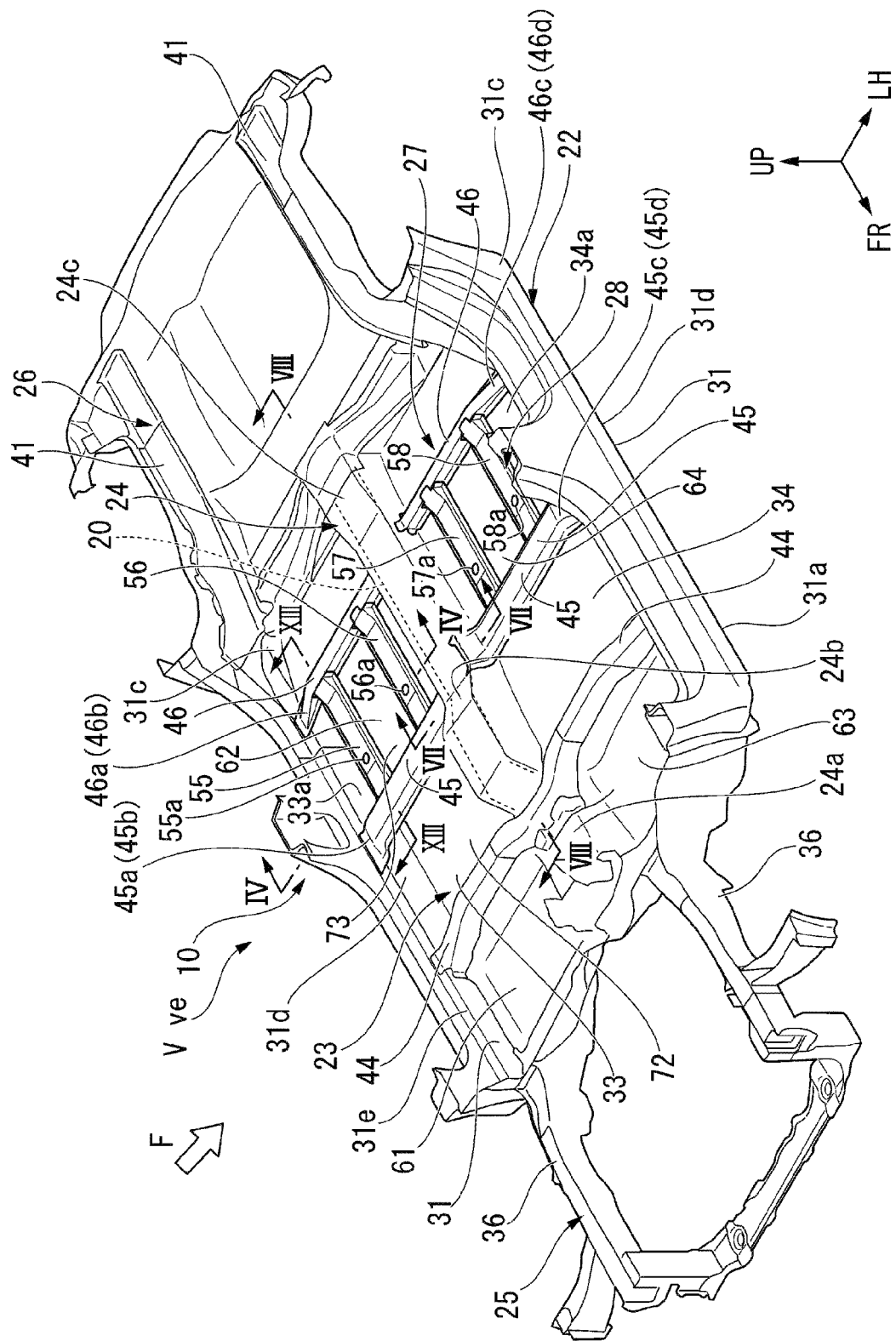
FIG. 2 is a perspective view of the vehicle equipped with a battery pack according to the embodiment of the disclosure as viewed inclinedly from the front.
Figure 3:
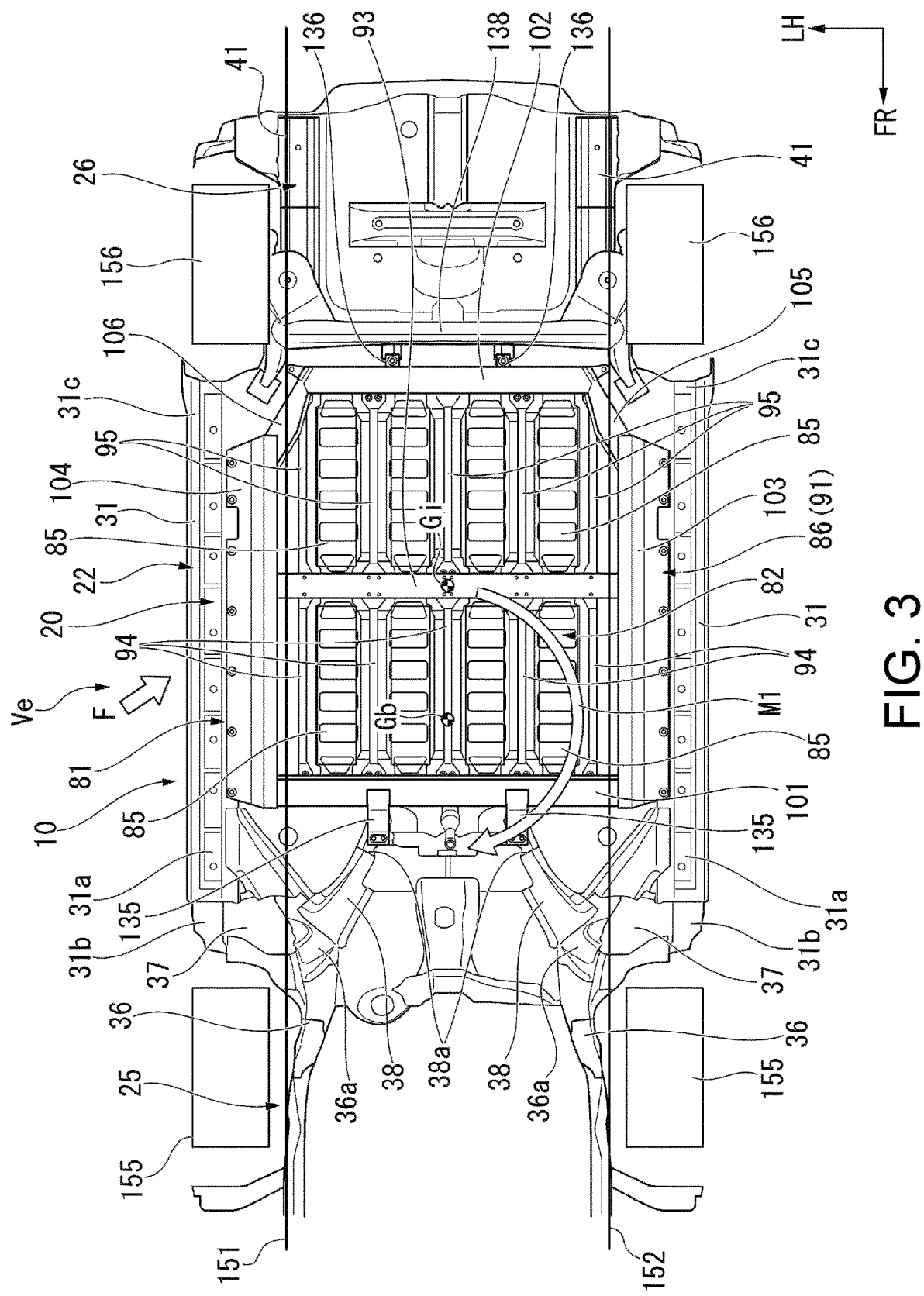
FIG. 3 is a bottom view of the vehicle equipped with a battery pack according to the embodiment of the disclosure.
Figure 4:
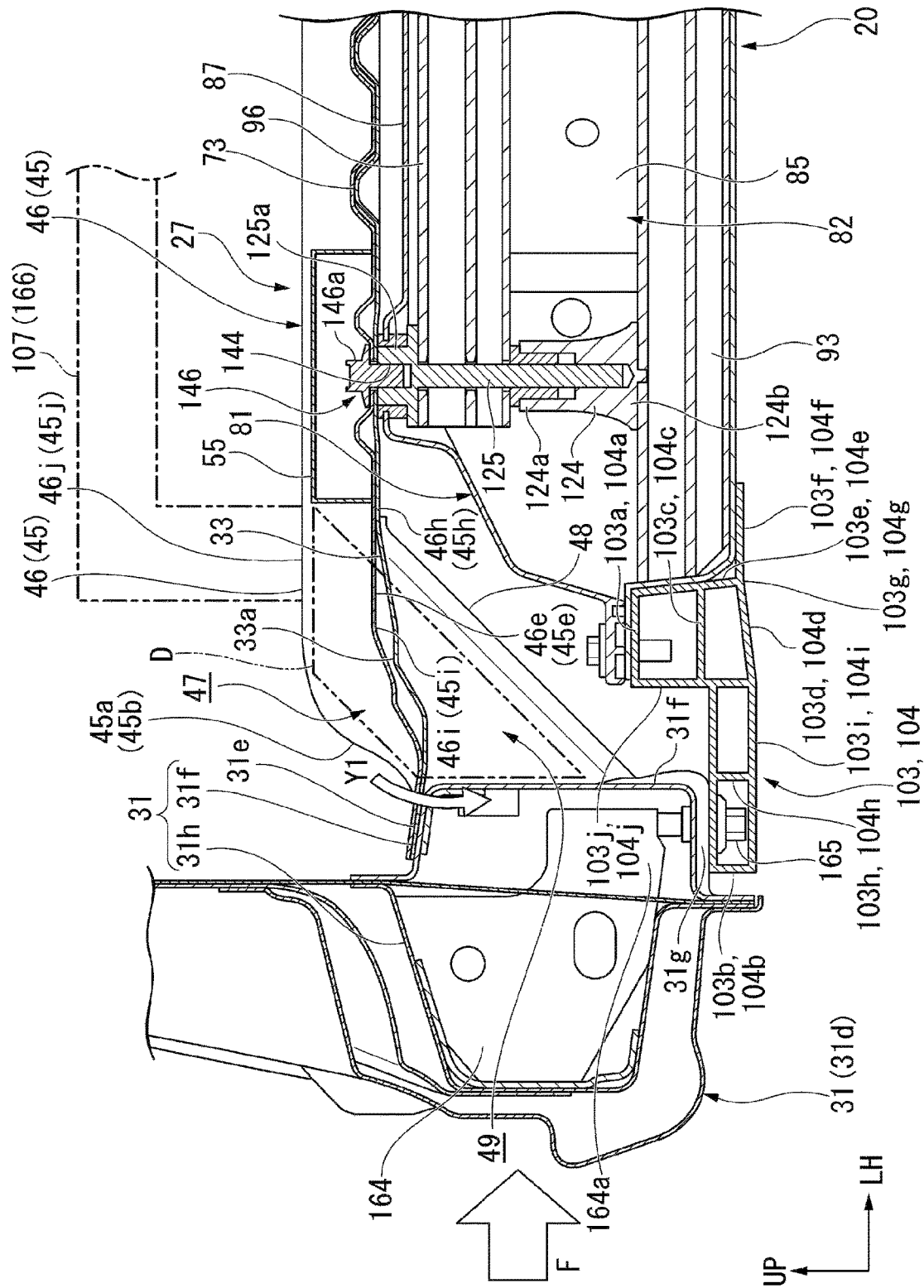
FIG. 4 is a cross-sectional view taken along line IV-IV in FIG. 2.

FIG. 1 is a schematic view of a vehicle Ve equipped with a battery pack as viewed from a left side. FIG. 2 is a perspective view of the vehicle Ve equipped with a battery pack as viewed inclinedly from the front. FIG. 3 is a bottom view of the vehicle Ve equipped with a battery pack. FIG. 4 is a cross-sectional view taken along line IV-IV in the vehicle Ye equipped with a battery pack in FIG. 2.

As shown in FIGS. 1 to 4, the vehicle Ve equipped with a battery pack includes a vehicle body 10, and a battery pack 20 arranged in a center of a lower portion of the vehicle body 10. The vehicle body 10 includes a side sill unit 22, a floor panel 23, a floor tunnel 24, a front side frame unit 25, a rear frame unit 26, a floor cross member unit 27, and a floor longitudinal frame unit 28.

The side sill unit 22 includes a right side sill (side sill) 31 and a left side sill (side sill) 31.

The right side sill (a side portion of the vehicle body in a vehicle width direction) 31 overlaps mutual opening side of an inner panel 31f and an outer panel 31h formed in a C-shape as viewed from a front-rear direction of the vehicle body to form a closed cross section. The inner panel 31f is arranged inside in the vehicle width direction, and the outer panel 31h is arranged on a right outer side in the vehicle width direction. The right side sill 31 is a highly rigid member that constitutes a part of a framework of the vehicle body 10. The right side sill 31 is arranged on the right outer side in the vehicle width direction and extends in the front-rear direction of the vehicle body along the right outer portion of the floor panel 23 in the vehicle width direction.

The left side sill (a side portion of the vehicle body in the vehicle width direction) 31 overlaps mutual opening side of an inner panel 31f and an outer panel 31h formed in a C-shape as viewed from a front-rear direction of the vehicle body to form a closed cross section. The inner panel 31f is arranged inside in the vehicle width direction, and the outer panel 31h is arranged on a left outer side in the vehicle width direction. The left side sill 31 is a highly rigid member that constitutes a part of the framework of the vehicle body 10. The left side sill 31 is arranged on the left outer side in the vehicle width direction and extends in the front-rear direction of the vehicle body along the left outer portion of the floor panel 23 in the vehicle width direction.

In the outer panel 31h of each side sill 31, a bulkhead 164 is arranged at a location facing left and right second floor cross members 45 and left and right third floor cross members 46 (described later) in the vehicle width direction.

The bulkhead 164 is formed in a square shape in a manner of corresponding to the shape of the outer panel 31h when viewed from the front-rear direction. An extension portion 164a is integrally formed inside the bulkhead 164 in the vehicle width direction from substantially a center in an up-down direction to a lower end. The extension portion 164a extends inward in the vehicle width direction in a manner of facing the inside of the inner panel 31f.

The floor panel 23 is arranged between the left side sill 31 and the right side sill 31. The floor panel 23 is a plate-shaped member having a substantially rectangular shape in a plan view and forms a floor portion of the vehicle body 10. The floor panel 23 includes a first floor portion 33 and a second floor portion 34.

The first floor portion 33 is arranged on a right side in the vehicle width direction between the right side sill 31 and the floor tunnel 24. The second floor portion 34 is arranged on a left side in the vehicle width direction between the left side sill 31 and the floor tunnel 24.

The floor tunnel 24 is extended in the front-rear direction of the vehicle body between the first floor portion 33 and the second floor portion 34.

The front side frame unit 25 includes a right front side frame 36 and a left front side frame 36. The right front side frame 36 and the left front side frame 36 are arranged in front of the battery pack 20 in the vehicle body.

The right front side frame 36 extends from a front portion 31a of the right side sill 31 toward the front of the vehicle body and is formed in a substantially V-shape in a plan view. The right front side frame 36 is a highly rigid member that is formed in a closed cross section and constitutes a part of the framework of the vehicle body 10. The right front side frame 36 has a bent portion (a rear end portion of the right front side frame 36) 36a connected to a front end portion 31b of the right side sill 31 by a right outrigger 37. A right branch portion 38 is joined to the right bent portion 36a.

The right branch portion 38 is extended inward in an inclined manner in the vehicle width direction toward the rear of the vehicle body. A rear end portion 38a of the right branch portion 38 is coupled to a right front support bracket 135 (described later) of the battery pack 20.

The left front side frame 36 extends from a front portion 31a of the left side sill 31 toward the front of the vehicle body and is formed in a substantially V-shape in a plan view. The left front side frame 36 is a highly rigid member that is formed in a closed cross section and constitutes a part of the framework of the vehicle body 10. The left front side frame 36 has a bent portion (a rear end portion of the left front side frame 36) 36a connected to a front end portion 31b of the left side sill 31 by a left outrigger 37. A left branch portion (branch portion) 38 is joined to a left bent portion 36a.

The left branch portion 38 is extended inward in an inclined manner in the vehicle width direction toward the rear of the vehicle body. A rear end portion 38a of the left branch portion 38 is coupled to a left front support bracket 135 (described later) of the battery pack 20.

The rear frame unit 26 has a right rear frame 41 and a left rear frame 41. The right rear frame 41 and the left rear frame 41 are arranged at the rear of the battery pack 20 in the vehicle body.

The right rear frame 41 extends from a rear end portion 31c of the right side sill 31 toward the rear of the vehicle body and is formed in a substantially J-shape in a plan view. The right rear frame 41 is a highly rigid member that is formed in a closed cross section and constitutes a part of the framework of the vehicle body 10.

The left rear frame 41 extends from a rear end portion 31c of the left side sill 31 toward the rear of the vehicle body and is formed in a substantially J-shape in a plan view. The left rear frame 41 is a highly rigid member that is formed in a closed cross section and constitutes a part of the framework of the vehicle body 10.

The floor cross member unit 27 is arranged between the right side sill 31 and the left side sill 31 and is joined along an upper surface of the floor panel 23.

The floor cross member unit 27 includes a right first floor cross member 44, a left first floor cross member 44, a right second floor cross member (floor cross member) 45, a left second floor cross member (floor cross member) 45, a right third floor cross member (floor cross member) 46, and a left third floor cross member (floor cross member) 46.

The right first floor cross member 44 is extended in the vehicle width direction at the first floor portion 33 between the vicinity of the front portion 31a of the right side sill 31 and a front portion 24a of the floor tunnel 24. The right first floor cross member 44 is raised from the upper surface of the first floor portion 33, and forms a closed cross section with the first floor portion 33.

The left first floor cross member 44 is extended in the vehicle width direction at the second floor portion 34 between the front portion 31a of the left side sill 31 and the front portion 24a of the floor tunnel 24. The left first floor cross member 44 is raised from the upper surface of the second floor portion 34, and forms a closed cross section with the second floor portion 34.

Figure 5:
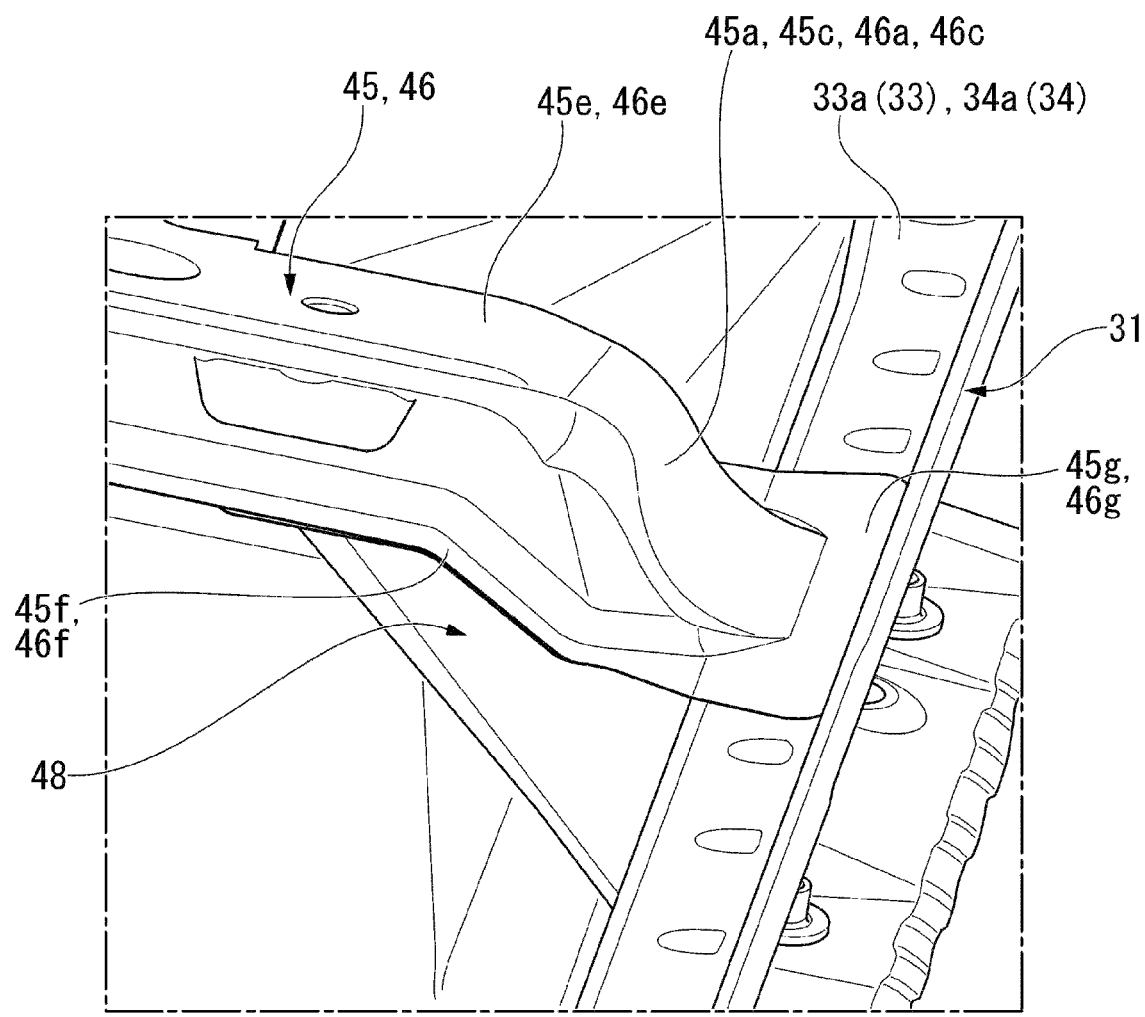
FIG. 5 is a perspective view of a right end portion of a second floor cross member on a right side in an embodiment of the disclosure as viewed inclinedly from above.

FIG. 5 is a perspective view of a right end portion 45a of the right second floor cross member 45 as viewed inclinedly from above. FIG. 5 shows the first floor portion 33 transparently for clarity of description. Moreover, in order to simplify the drawings in the following description, FIGS. 4 and 5 may be used for a left vehicle body structure.

As shown in FIGS. 2, 4, and 5, the right second floor cross member 45 extends in the vehicle width direction between a center 31d of the right side sill 31 and a center 24b of the floor tunnel 24. The right second floor cross member 45 is raised from the upper surface of the first floor portion 33 and has a hat-shaped cross section along the front-rear direction and the up-down direction. The right second floor cross member 45 forms a closed cross section together with the first floor portion 33 with a flange portion 45g formed on a peripheral edge facing downward.

In the right second floor cross member 45, a top portion 45b of the right end portion (end portion) 45a is inclined downward toward the right outer side in the vehicle width direction up to the center 31d of the right side sill 31. In other words, the right second floor cross member 45 has a cross member horizontal portion (first horizontal portion) 45e located closer to a center side in the vehicle width direction than the right end portion 45a and extending along the vehicle width direction. The right end portion 45a is bent and extended inclinedly downward toward the right outer side in the vehicle width direction from the cross member horizontal portion 45e via a cross member bent portion (first bent portion) 45i. Hereinafter, the right end portion 45a of the right second floor cross member 45 may also be referred to as "cross member right end portion 45a".

A cross member inclined closed cross section (closed cross section) 47 is formed by the cross member right end portion 45a and a right end portion (an outer portion of the floor panel in the vehicle width direction) 33a of the first floor portion 33. The cross member inclined closed cross section 47 is gradually reduced in a cross-sectional area toward the right outer side in the vehicle width direction. An upper end 31e of the inner panel 31f at the center 31d of the right side sill 31 is joined to a distal end (right end) of this cross member right end portion 45a via the first floor portion 33 (floor panel 23) (details are described later). That is, the first floor portion 33 (floor panel 23) and the right side sill 31 are arranged below the right second floor cross member 45.

In addition, in the right second floor cross member 45, a seat fixing portion 45j is formed on an upper portion of the cross member horizontal portion 45e on a right end side (a side slightly closer to the center than the cross member right end portion 45a in the vehicle width direction). A right front seat 166 on which an occupant 66 (see FIG. 1) is seated is fixed to the seat fixing portion 45j.

Figure 6:
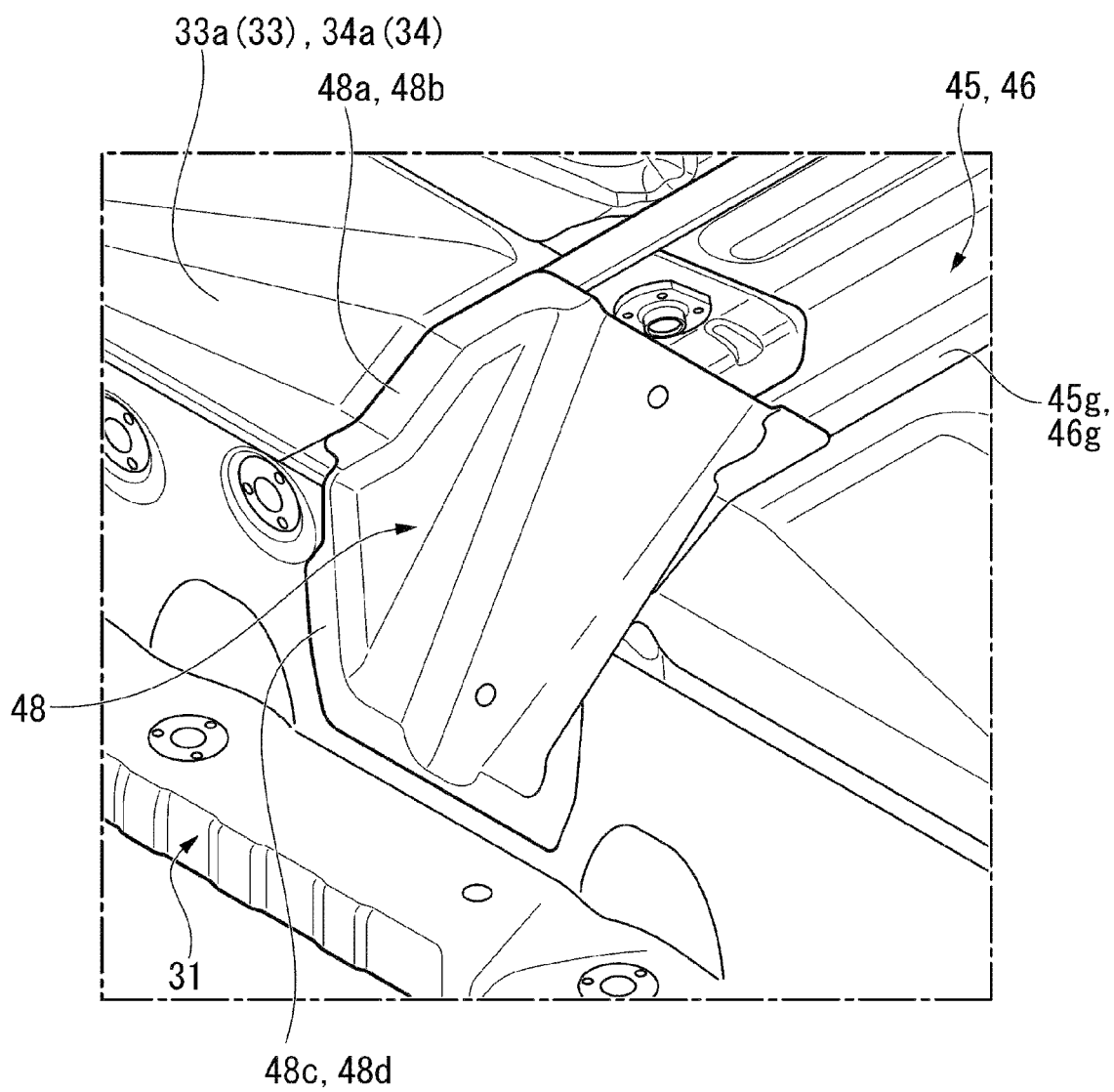
FIG. 6 is a perspective view of an inclined member according to the embodiment of the disclosure as viewed inclinedly from below.

FIG. 6 is a perspective view of an inclined member 48 viewed inclinedly from below. FIG. 6 shows the first floor portion 33 transparently for clarity of description. Moreover, in order to simplify the drawings in the following description, FIG. 6 may be used for the left vehicle body structure.

As shown in FIGS. 4 to 6, the inclined member (gusset) 48 is arranged below the cross member right end portion 45a. The inclined member 48 is formed in a manner of straddling the inner panel 31f of the right side sill 31 and a lower surface 45h of the right second floor cross member 45.

More specifically, a right end 48c of the inclined member 48 is arranged slightly below a center of the inner panel 31f in the up-down direction, and is arranged in a manner of facing the extension portion 164a of the bulkhead 164 in the vehicle width direction. An upper end 48b of the inclined member 48 is arranged at a location directly below the seat fixing portion 45j on the lower surface 45h of the right second floor cross member 45.

In addition, the inclined member 48 has a hat-shaped cross section along the front-rear direction and the up-down direction, and is arranged with a flange portion 48a formed on a peripheral edge facing upward and rightward.

The upper end 48b (flange portion 48a) of the inclined member 48 is formed with an incline in a manner of corresponding to the shape of the cross member right end portion 45a. The inclined member 48 is arranged below the first floor portion 33 (specifically, the right end portion 33a) in a manner of sandwiching the right end portion (a portion in the vicinity of the side sill 31) 33a of the first floor portion 33 together with the cross member right end portion 45a.

In addition, the inclined member 48 forms an inclined closed cross section (closed cross section) 49 up to the center 31d of the right side sill 31 together with the right end portion 33a of the first floor portion 33. Thereby, the right end portion 33a of the first floor portion 33 is reinforced by the right second floor cross member 45 and the inclined member 48. Here, the inclined closed cross section 49 is formed larger than the cross member inclined closed cross section 47.

Furthermore, a location located in the front-rear direction of the flange portion 45g of the cross member right end portion 45a and a location located in the front-rear direction of the flange portion 48a of the inclined member 48 are overlapped and coupled to each other with the right end portion 33a of the first floor portion 33 sandwiched therebetween. Besides, when viewed from the front-rear direction, the cross member right end portion 45a and the inclined member 48 form a trapezoidal shape (see a portion D indicated by a two-dot chain line in FIG. 4).

Hereinafter, a left second floor cross member 45, a right third floor cross member 46, and a left third floor cross member 46 are described. Note that, in the following description, for the sake of convenience, the cross member inclined closed cross section, the inclined member, and the inclined closed cross section are described with the same signs as the cross member inclined closed cross section 47, the inclined member 48, and the inclined closed cross section 49 described for the right second floor cross member 45.

In addition, because basic configurations of the left second floor cross member 45, the right third floor cross member 46, and the left third floor cross member 46 are the same as that of the right second floor cross member 45, in the following description, the same configurations are described with the same reference numerals with reference to FIGS. 4 to 6.

As shown in FIGS. 2 to 6, the left second floor cross member 45 extends in the vehicle width direction between a center 31d of the left side sill 31 and the center 24b of the floor tunnel 24. The left second floor cross member 45 is raised from the upper surface of the second floor portion 34 and has a hat-shaped cross section along the front-rear direction and the up-down direction. The left second floor cross member 45 forms a closed cross section together with the first floor portion 33 with the flange portion 45g formed on a peripheral edge facing downward.

In the left second floor cross member 45, a top portion 45d of the left end portion (end portion) 45c is inclined downward toward the left outer side in the vehicle width direction up to the center 31d of the left side sill 31. In other words, the left second floor cross member 45 has a cross member horizontal portion (first horizontal portion) 45e located closer to the center side in the vehicle width direction than the left end portion 45c and extending along the vehicle width direction. The left end portion 45c is bent and extended inclinedly downward toward the left outer side in the vehicle width direction from the cross member horizontal portion 45e via the cross member bent portion (first bent portion) 45i. Hereinafter, the left end portion 45c of the left second floor cross member 45 may also be referred to as "cross member left end portion 45c".

A cross member inclined closed cross section (closed cross section) 47 is formed by the cross member left end portion 45c and a left end portion (an outer portion of the floor panel in the vehicle width direction) 34a of the second floor portion 34. The cross member inclined closed cross section 47 is gradually reduced in a cross-sectional area toward the left outer side in the vehicle width direction. An upper end 31e of the inner panel 31f at the center 31d of the left side sill 31 is joined to a front end (left end) of this cross member left end portion 45c via the second floor portion 34 (floor panel 23) (details are described later). That is, the second floor portion 34 (floor panel 23) and the left side sill 31 are arranged below the left second floor cross member 45.

In addition, in the left second floor cross member 45, a seat fixing portion 45j is formed on an upper portion of the cross member horizontal portion 45e on a left end side (a side slightly closer to the center than the cross member left end portion 45c in the vehicle width direction). A left front seat 166 on which an occupant 68 (see FIG. 1) is seated is fixed to the seat fixing portion 45j.

The inclined member 48 (gusset) is arranged below the cross member left end portion 45c. The inclined member 48 is formed in a manner of straddling an inner panel 31f of the left side sill 31 and a lower surface 45h of the left second floor cross member 45.

More specifically, a left end 48d of the inclined member 48 is arranged slightly below a center of the inner panel 31f in the up-down direction, and is arranged in a manner of facing the extension portion 164a of the bulkhead 164 in the vehicle width direction. An upper end 48b of the inclined member 48 is arranged at a location directly below the seat fixing portion 45j on the lower surface 45h of the left second floor cross member 45.

In addition, the inclined member 48 has a hat-shaped cross section along the front-rear direction and the up-down direction, and is arranged with a flange portion 48a formed on a peripheral edge facing upward and leftward.

The upper end 48b (flange portion 48a) of the inclined member 48 is formed with an incline in a manner of corresponding to the shape of the cross member left end portion 45c. The inclined member 48 is arranged below the second floor portion 34 (specifically, the left end portion 34a) in a manner of sandwiching the left end portion (a portion in the vicinity of the side sill 31) 34a of the second floor portion 34 together with the cross member left end portion 45c.

In addition, the inclined member 48 forms an inclined closed cross section (closed cross section) 49 (not shown) up to the center 31d of the left side sill 31 together with the left end portion 34a of the second floor portion 34. Thereby, the left end portion 34a of the second floor portion 34 is reinforced by the left second floor cross member 45 and the inclined member 48. Here, the inclined closed cross section 49 is formed larger than the cross member inclined closed cross section 47.

Furthermore, a location located in the front-rear direction of the flange portion 45g of the cross member left end portion 45c and a location located in the front-rear direction of the flange portion 48a of the inclined member 48 are overlapped and coupled to each other with the left end portion 34a of the second floor portion 34 sandwiched therebetween. Besides, when viewed from the front-rear direction, the cross member left end portion 45c and the inclined member 48 form a trapezoidal shape (see the portion D indicated by a two-dot chain line in FIG. 4).

The right third floor cross member 46 extends in the vehicle width direction on the first floor portion 33 between the vicinity of the rear end portion 31c of the right side sill 31 and the vicinity of a rear end portion 24c of the floor tunnel 24. The right third floor cross member 46 is raised from the upper surface of the first floor portion 33 and has a hat-shaped cross section along the front-rear direction and the up-down direction. The right third floor cross member 46 forms a closed cross section together with the first floor portion 33 with the flange portion 45g formed on a peripheral edge facing downward.

In the right third floor cross member 46, a top portion 46b of a right end portion (end portion) 46a is inclined downward toward the right outer side in the vehicle width direction up to the vicinity of the rear end portion 31c of the right side sill 31. In other words, the right third floor cross member 46 has a cross member horizontal portion (first horizontal portion) 46e located closer to the center side in the vehicle width direction than the right end portion 46a and extending along the vehicle width direction. The right end portion 46a is bent and extended inclinedly downward toward the right outer side in the vehicle width direction from the cross member horizontal portion 46e via a cross member bent portion (first bent portion) 46i. Hereinafter, the right end portion 46a of the right third floor cross member 46 may also be referred to as "cross member right end portion 46a".

A cross member inclined closed cross section (closed cross section) 47 is formed by the cross member right end portion 46a and the right end portion 33a of the first floor portion 33. The cross member inclined closed cross section 47 is gradually reduced in a cross-sectional area toward the right outer side in the vehicle width direction. An upper end 31e of the inner panel 31f at the vicinity of the rear end portion 31c of the right side sill 31 is joined to a distal end (right end) of this cross member right end portion 46a via the first floor portion 33 (floor panel 23) (details are described later).

In addition, in the right third floor cross member 46, a seat fixing portion 46j is formed on an upper portion of the cross member horizontal portion 46e on a right end side (a side slightly closer to the center than the cross member right end portion 46a in the vehicle width direction). A right rear seat 167 on which an occupant 67 (see FIG. 1) is seated is fixed to the seat fixing portion 46j.

The inclined member 48 (gusset) is arranged below the cross member right end portion 46a. The inclined member 48 is formed in a manner of straddling the inner panel 31f of the right side sill 31 and a lower surface 46h of the right third floor cross member 46.

More specifically, a right end 48c of the inclined member 48 is arranged slightly below a center of the inner panel 31f in the up-down direction, and is arranged in a manner of facing the extension portion 164a of the bulkhead 164 in the vehicle width direction. An upper end 48b of the inclined member 48 is arranged at a location directly below the seat fixing portion 46j on the lower surface 46h of the right third floor cross member 46.

In addition, the inclined member 48 has a hat-shaped cross section along the front-rear direction and the up-down direction, and is arranged with a flange portion 48a formed on a peripheral edge facing upward and rightward.

The upper end 48b (flange portion 48a) of the inclined member 48 is formed with an incline in a manner of corresponding to the shape of the cross member right end portion 46a. The inclined member 48 is arranged below the first floor portion 33 (specifically, the right end portion 33a) in a manner of sandwiching the right end portion (a portion in the vicinity of the side sill 31) 33a of the first floor portion 33 together with the cross member right end portion 46a.

In addition, the inclined member 48 forms an inclined closed cross section (closed cross section) 49 (not shown) up to the vicinity of the rear end portion 31c of the right side sill 31 together with the right end portion 33a of the first floor portion 33. Thereby, the right end portion 33a of the first floor portion 33 can be reinforced by the right third floor cross member 46 and the inclined member 48. Here, the inclined closed cross section 49 is formed larger than the cross member inclined closed cross section 47.

Furthermore, a location located in the front-rear direction of the flange portion 46g of the cross member right end portion 46a and a location located in the front-rear direction of the flange portion 48a of the inclined member 48 are overlapped and coupled to each other with the right end portion 33a of the first floor portion 33 sandwiched therebetween. Besides, when viewed from the front-rear direction, the cross member right end portion 46a and the inclined member 48 form a trapezoidal shape (see the portion D indicated by a two-dot chain line in FIG. 4).

The left third floor cross member 46 extends in the vehicle width direction on the second floor portion 34 between the vicinity of the rear end portion 31c of the left side sill 31 and the vicinity of the rear end portion 24c of the floor tunnel 24. The left third floor cross member 46 is raised from the upper surface of the second floor portion 34 and has a hat-shaped cross section along the front-rear direction and the up-down direction. The left third floor cross member 46 forms a closed cross section together with the second floor portion 34 with the flange portion 46g formed on a peripheral edge facing downward.

In the left third floor cross member 46, a top portion 46d of the left end portion (end portion) 46c is inclined downward toward the left outer side in the vehicle width direction up to the vicinity of the rear end portion 31c of the left side sill 31. In other words, the left third floor cross member 46 has a cross member horizontal portion (first horizontal portion) 46e located closer to the center side in the vehicle width direction than the left end portion 46c and extending along the vehicle width direction. The left end portion 46c is bent and extended inclinedly downward toward the left outer side in the vehicle width direction from the cross member horizontal portion 46e via a cross member bent portion (first bent portion) 46i. Hereinafter, the left end portion 46c of the left third floor cross member 46 may also be referred to as "cross member left end portion 46c".

A cross member inclined closed cross section (closed cross section) 47 is formed by the cross member left end portion 46c and the left end portion 34a of the second floor portion 34. The cross member inclined closed cross section 47 is gradually reduced in a cross-sectional area toward the left outer side in the vehicle width direction. An upper end 31e of the inner panel 31f at the vicinity of the rear end portion 31c of the left side sill 31 is joined to a distal end (left end) of this cross member left end portion 46c via the second floor portion 34 (floor panel 23) (details are described later).

In addition, in the left third floor cross member 46, a seat fixing portion 46j is formed on an upper portion of the cross member horizontal portion 46e on a left end side (a side slightly closer to the center than the cross member left end portion 46c in the vehicle width direction). A left rear seat 167 on which an occupant 69 (see FIG. 1) is seated is fixed to the seat fixing portion 46j.

The inclined member 48 (gusset) is arranged below the cross member left end portion 46c. The inclined member 48 is formed in a manner of straddling the inner panel 31f of the left side sill 31 and a lower surface 46h of the left third floor cross member 46.

More specifically, the left end 48d of the inclined member 48 is arranged slightly below a center of the inner panel 31f in the up-down direction, and is arranged in a manner of facing the extension portion 164a of the bulkhead 164 in the vehicle width direction. An upper end 48b of the inclined member 48 is arranged at a location directly below the seat fixing portion 46j on the lower surface 46h of the left third floor cross member 46.

In addition, the inclined member 48 has a hat-shaped cross section along the front-rear direction and the up-down direction, and is arranged with a flange portion 48a formed on a peripheral edge facing upward and leftward.

The upper end 48b (flange portion 48a) of the inclined member 48 is formed with an incline in a manner of corresponding to the shape of the cross member left end portion 46c. The inclined member 48 is arranged below the second floor portion 34 (specifically, the left end portion 34a) in a manner of sandwiching the left end portion (a portion in the vicinity of the side sill 31) 34a of the second floor portion 34 together with the cross member left end portion 46c.

In addition, the inclined member 48 forms an inclined closed cross section (closed cross section) 49 (not shown) up to the vicinity of the rear end portion 31c of the left side sill 31 together with the left end portion 34a of the second floor portion 34. Thereby, the left end portion 34a of the second floor portion 34 can be reinforced by the left third floor cross member 46 and the inclined member 48. Here, the inclined closed cross section 49 is formed larger than the cross member inclined closed cross section 47.

Furthermore, a location located in the front-rear direction of the flange portion 46g of the cross member left end portion 46c and a location located in the front-rear direction of the flange portion 48a of the inclined member 48 are overlapped and coupled to each other with the left end portion 34a of the second floor portion 34 sandwiched therebetween. Besides, when viewed from the front-rear direction, the cross member left end portion 46c and the inclined member 48 form a trapezoidal shape (see the portion D indicated by a two-dot chain line in FIG. 4).

Moreover, in the description of the left and right second floor cross members 45 and the left and right third floor cross members 46, the reason for making the inclined closed cross section 49 larger than the cross member inclined closed cross section 47 is described in detail later.

Figure 7:
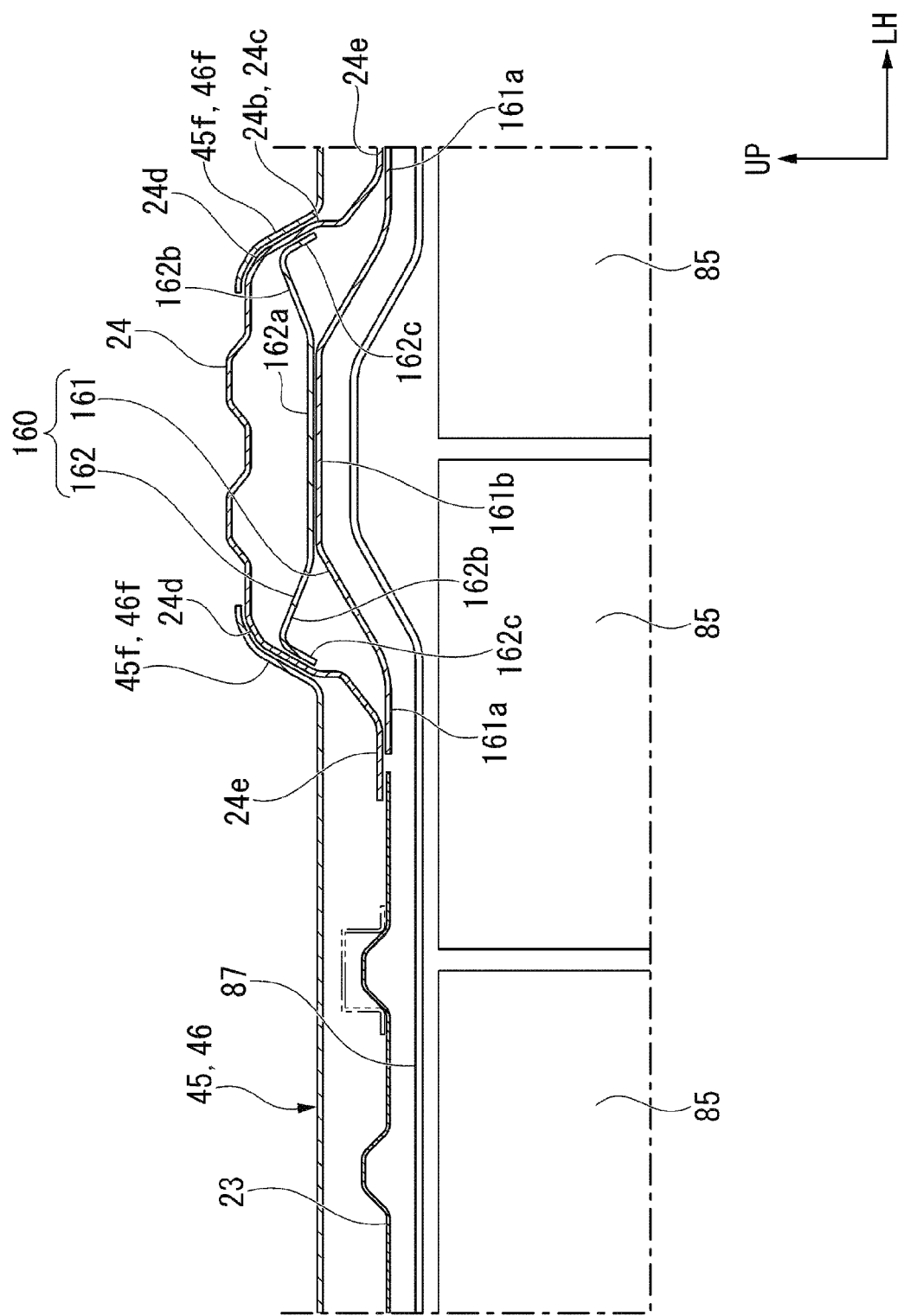
FIG. 7 is a cross-sectional view taken along line VII-VII in FIG. 2.

FIG. 7 is a cross-sectional view taken along line VII-VII in the vehicle Ve equipped with a battery pack in FIG. 2.

As shown in FIG. 7, the floor tunnel 24 is raised upward from the floor panel 23 and has a hat-shaped cross section along the vehicle width direction and the up-down direction. Central end portions 45f and 46f on a center side in the vehicle width direction in the corresponding floor cross members 45 and 46 are joined to a periphery of an upper corner portion 24d (a side surface of the upper portion in the vehicle width direction) in the vicinity of the center 24b and the rear end portion 24c of the floor tunnel 24, respectively. Each of the central end portions 45f and 46f is formed to be bent upward along an outer surface of the floor tunnel 24.

In addition, in the floor tunnel 24, a brace reinforcing portion 160 is arranged at a location where each of the floor cross members 45 and 46 is joined. The brace reinforcing portion 160 includes a first reinforcing portion 161 in which both ends in the vehicle width direction are joined to a flange portion (root portion) 24e of the floor tunnel 24, and a second reinforcing portion 162 arranged above the first reinforcing portion 161.

The first reinforcing portion 161 has a hat-shaped cross section along the vehicle width direction and the up-down direction, and is arranged with flange portions 161a on both outer sides in the vehicle width direction facing downward. Besides, the flange portion 161a is joined to a lower surface of the flange portion 24e in the floor tunnel 24.

In addition, in the first reinforcing portion 161, an upper end portion 161b at a center in the vehicle width direction is formed flat with a constant width in the vehicle width direction. The second reinforcing portion 162 is joined to the upper end portion 161b formed flat.

The second reinforcing portion 162 includes a flat portion 162a that is overlapped with and joined to the upper end portion 161b of the first reinforcing portion 161, and an extension portion 162b that is integrally formed on both side portions of the flat portion 162a in the vehicle width direction. The extension portion 162b is bent and extended inclinedly upward from both side portions of the flat portion 162a in the vehicle width direction toward the central end portions 45*f* and 46*f* of the floor cross members 45 and 46. In addition, joint portions 162*c* folded downward are integrally formed at both end portions of the extension portion 162*b* in the vehicle width direction. The joint portion 162*c* is joined to the central end portions 45*f* and 46*f* of the floor cross members 45 and 46 with a periphery of the upper corner portion 24*d* of the floor tunnel 24 sandwiched therebetween.

The brace reinforcing portion 160 reinforces the inside of the floor tunnel 24 in a brace shape by integrating the first reinforcing portion 161 and the second reinforcing portion 162. That is, the brace reinforcing portion 160 joins a left flange portion 24*e* of both flange portions 24*e* in the vehicle width direction of the floor tunnel 24 with the central end portion 45*f* of the right second floor cross member 45 and the central end portion 46*f* of the right third floor cross member 46. In addition, the brace reinforcing portion 160 joins a right flange portion 24*e* of both flange portions 24*e* in the vehicle width direction of the floor tunnel 24 with the central end portion 45*f* of the left second floor cross member 45 and the central end portion 46*f* of the left third floor cross member 46.

As shown in FIGS. 2 and 3, the floor longitudinal frame unit 28 has a plurality of first to fourth floor longitudinal frames (floor frames) 55 to 58 spaced apart on the floor panel 23 in the vehicle width direction. Specifically, the floor longitudinal frame unit 28 includes the first floor longitudinal frame 55 and the second floor longitudinal frame 56 arranged on the first floor portion 33, and the third floor longitudinal frame 57 and the fourth floor longitudinal frame 58 arranged on the second floor portion 34.

The first floor longitudinal frame 55 and the second floor longitudinal frame 56 are arranged apart from each other on the first floor portion 33 in the vehicle width direction and form a closed cross section with the first floor portion 33. Each front end portion of the first floor longitudinal frame 55 and the second floor longitudinal frame 56 is joined (coupled) to the right second floor cross member 45, and each rear end portion is joined (coupled) to the right third floor cross member 46. Moreover, the number of the floor longitudinal frames arranged on the first floor portion 33 can be selected arbitrarily.

The third floor longitudinal frame 57 and the fourth floor longitudinal frame 58 are arranged apart from each other on the second floor portion 34 in the vehicle width direction and form a closed cross section with the second floor portion 34. Each front end portion of the third floor longitudinal frame 57 and the fourth floor longitudinal frame 58 is joined (coupled) to the left second floor cross member 45, and each rear end portion is joined (coupled) to the left third floor cross member 46. Moreover, the number of the floor longitudinal frames arranged on the second floor portion 34 can be selected arbitrarily.

As shown in FIGS. 1 and 2, the first floor portion 33 has a first front footrest (footrest) 61 and a first rear footrest (footrest) 62.

The first front footrest 61 is arranged in a portion in front of the battery pack 20 in the vehicle body. Feet 66*a* of the occupant 66 seated in a right front seat (a seat, not shown) are placed on the first front footrest 61. The first rear footrest 62 is arranged above the battery pack 20 and between the first floor longitudinal frame 55 and the second floor longitudinal frame 56. Feet 67*a* of the occupant 67 seated in a right rear seat (a seat, not shown) are placed on the first rear footrest 62.

In addition, the second floor portion 34 has a second front footrest (footrest) 63, and a second rear footrest (footrest) 64.

The second front footrest 63 is arranged in a portion in front of the battery pack 20 in the vehicle body. Feet 68*a* of the occupant 68 seated in a left front seat (a seat, not shown) are placed on the second front footrest 63. The second rear footrest 64 is arranged above the battery pack 20 and between the third floor longitudinal frame 57 and the fourth floor longitudinal frame 58. Feet 69*a* of the occupant 69 seated in a left rear seat (a seat, not shown) are placed on the second rear footrest 64.

Note that, in the embodiment, an example has been described in which the first front footrest 61, the second front footrest 63, the first rear footrest 62, and the second rear footrest 64 are arranged on the floor panel 23, but the disclosure is not limited thereto. As another example, for example, one of the first front footrest 61, the second front footrest 63, the first rear footrest 62, and the second rear footrest 64 may be arranged on the floor panel 23.

In addition, the floor panel 23 has a front floor portion 72 formed at a portion in the vehicle body front of the battery pack 20, and a main floor portion 73 formed at a portion above the battery pack 20. The front floor portion 72 has the first front footrest 61 and the second front footrest 63.

The main floor portion 73 has the first rear footrest 62 and the second rear footrest 64. The main floor portion 73 is joined to the upper end 31*e* of each inner panel 31*f* of the right side sill 31 and the left side sill 31 (the left upper end 31*e* is not shown). By joining the main floor portion 73 to each upper end 31*e* of the right side sill 31 and the left side sill 31, a boundary between the main floor portion 73 and the right side sill 31 can be formed flat without any step in the up-down direction. In addition, a boundary between the main floor portion 73 and the left side sill 31 can be formed flat without any step in the up-down direction. Thereby, for example, the occupants 66 to 69 can easily get on and off the vehicle Ve equipped with a battery pack.

As shown in FIGS. 1, 2, and 4, the main floor portion 73 is joined to each upper end 31*e* of the right side sill 31 and the left side sill 31 to facilitate the entry and exit of the occupants 66 to 69.

That is, a portion (right end portion) of the main floor portion 73 in the vicinity of the right side sill 31 is reinforced by the right second floor cross member 45 and the inclined member 48, and reinforced by the right third floor cross member 46 and the inclined member 48.

Similarly, a portion (left end portion) of the main floor portion 73 in the vicinity of the left side sill 31 is reinforced by the left second floor cross member 45 and the inclined member 48, and reinforced by the left third floor cross member 46 and the inclined member 48.

<Battery Pack>

Figure 8:
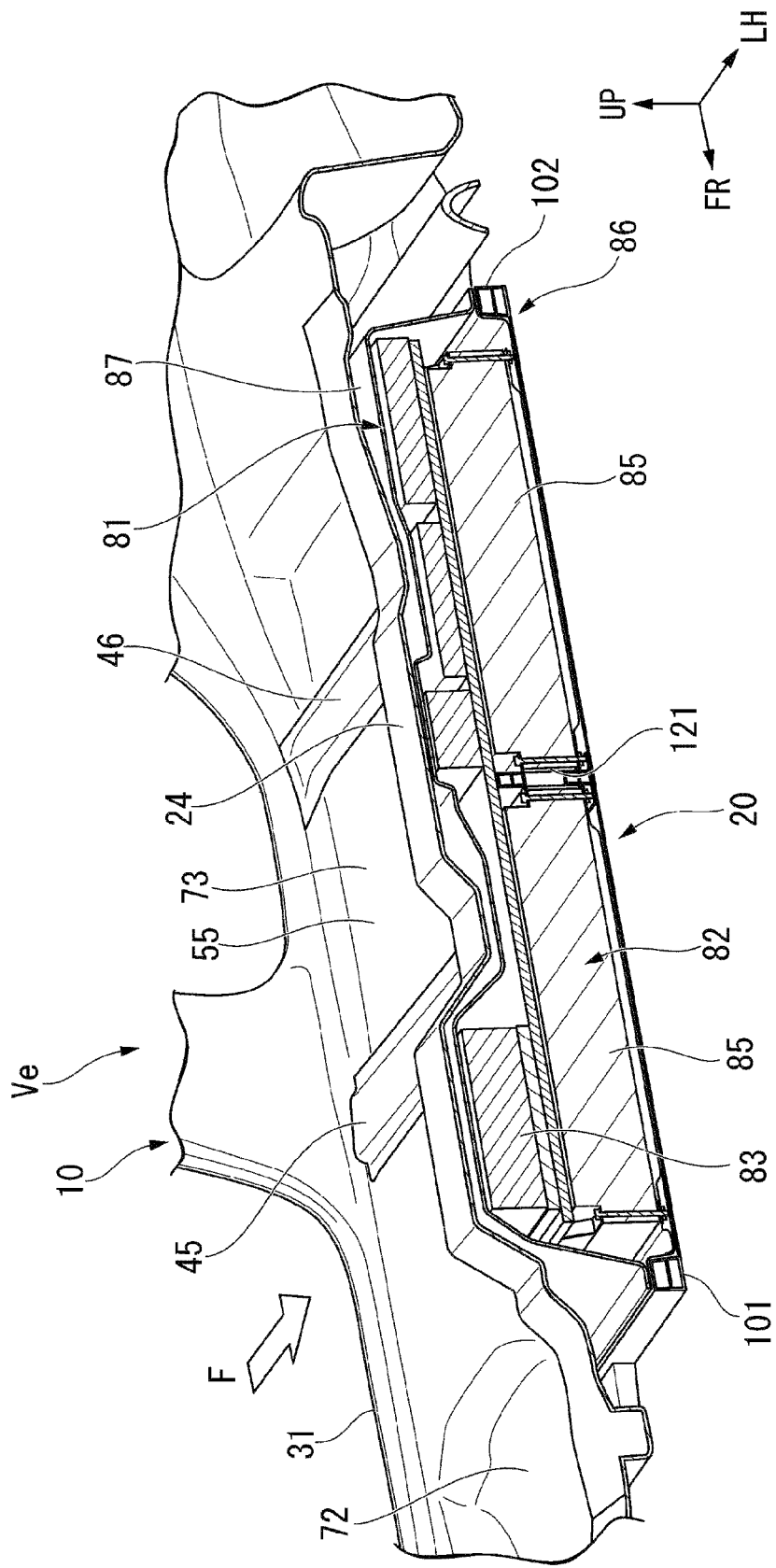
FIG. 8 is a cross-sectional view taken along line VIII-VIII in FIG. 2.
Figure 9:
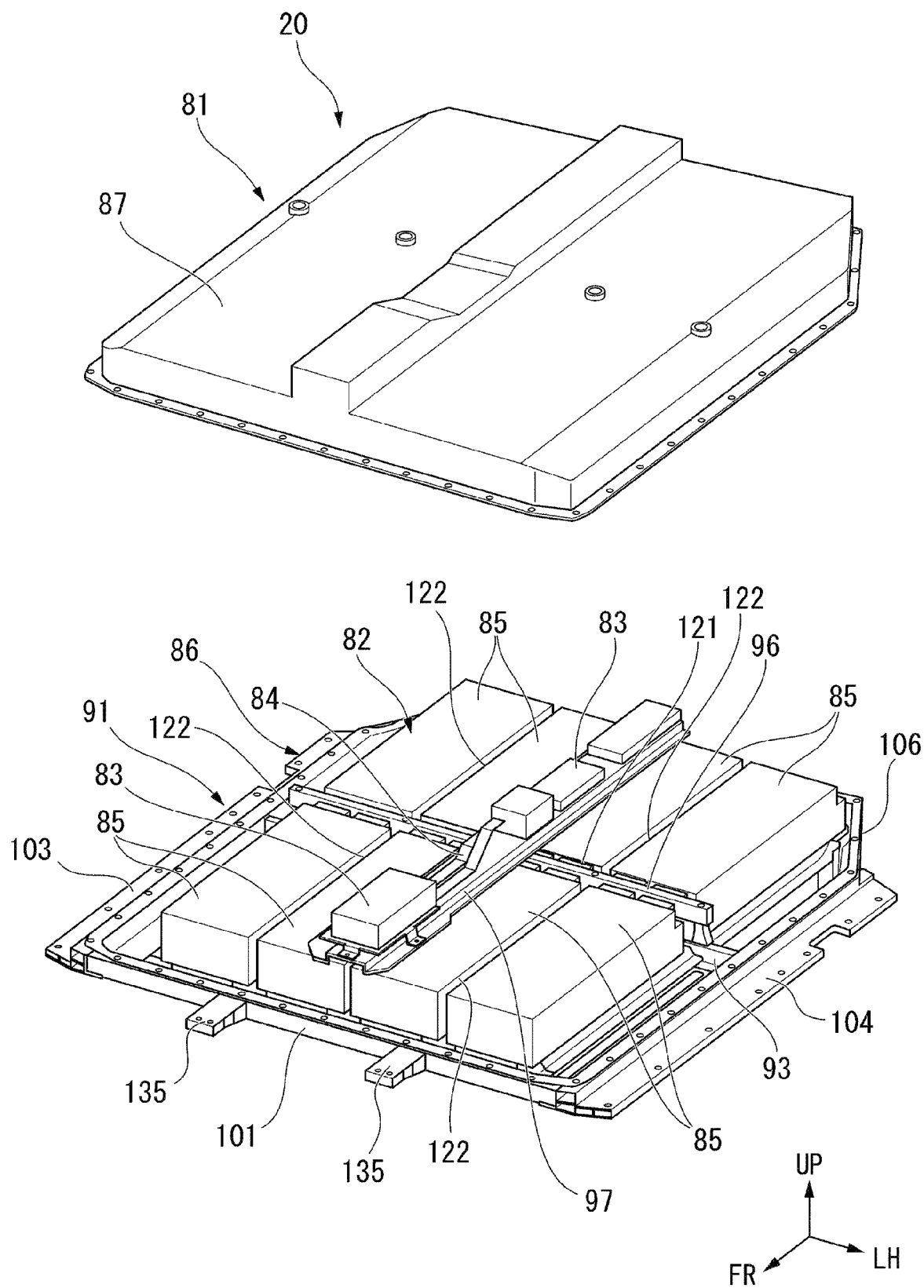
FIG. 9 is a perspective view showing a state in which a case cover is removed from the battery pack according to the embodiment of the disclosure.
Figure 10:
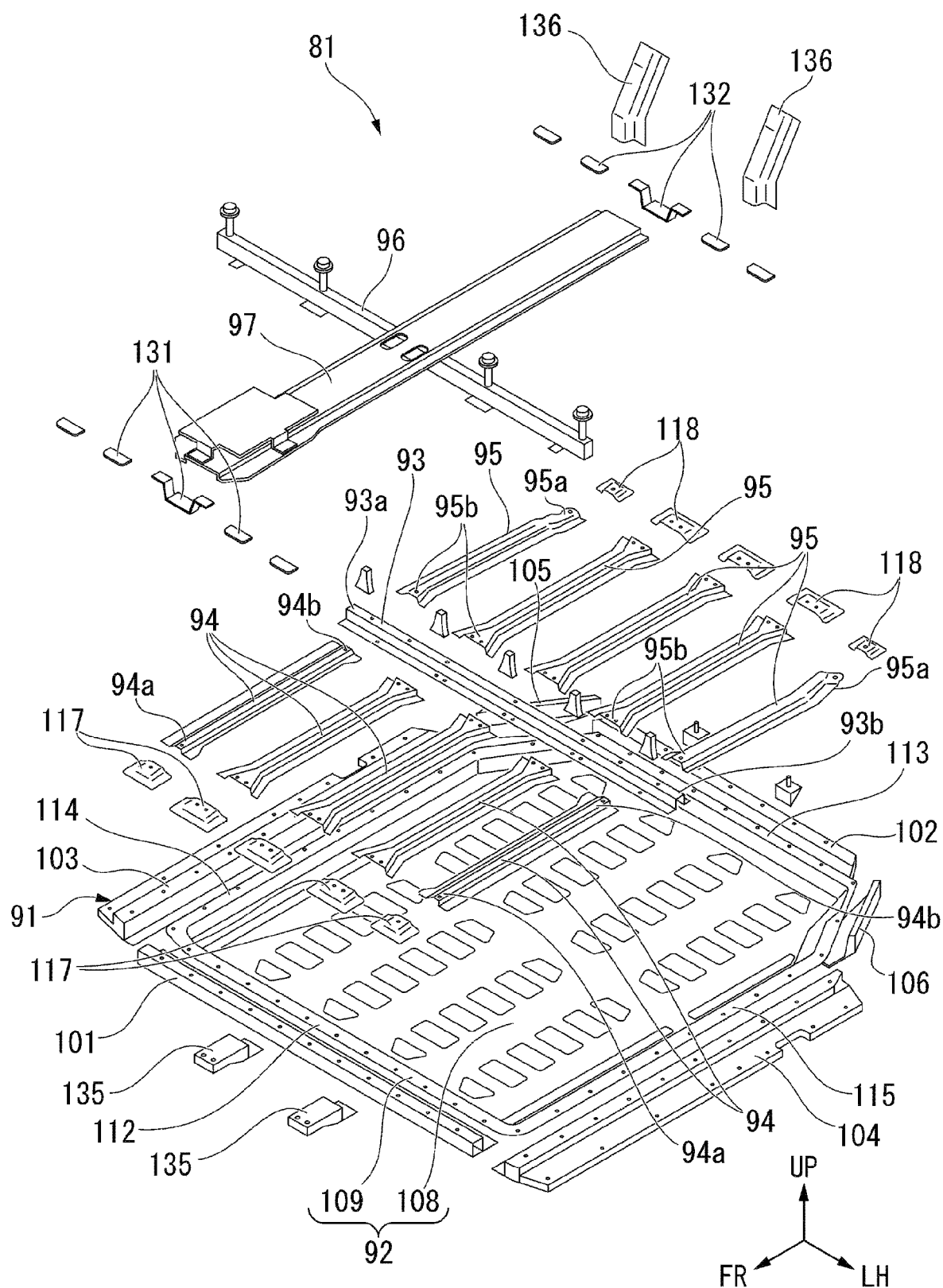
FIG. 10 is an exploded perspective view of the battery pack according to the embodiment of the disclosure.

FIG. 8 is a cross-sectional view taken along line VIII-VIII of the vehicle Ve equipped with a battery pack in FIG. 2. FIG. 9 is a perspective view showing a state in which a case cover 87 is removed from the battery pack 20. FIG. 10 is an exploded perspective view of the battery pack 20.

As shown in FIGS. 4, 8 to 10, the battery pack 20 is arranged below the main floor portion 73 (that is, under the floor of the vehicle Ve equipped with a battery pack). The battery pack 20 includes a battery case 81, a battery module 82, a battery accessory 83, and an electrical wiring 84.

(Battery case) The battery case 81 includes a case body 86 and a case cover 87. The case body 86 includes a case frame portion 91, a case portion 92, a lower cross member 93, a first longitudinal frame 94, a second longitudinal frame 95, an upper cross member 96, and an upper deck 97.

The case frame portion 91 includes a front frame 101, a rear frame 102, a right frame (side frame) 103, a left frame (side frame) 104, a right inclined frame 105, and a left inclined frame 106.

The front frame 101 is arranged at a distance in the front of the vehicle body with respect to a front side edge of the battery module 82 and extends in the vehicle width direction. The rear frame 102 is arranged at a distance at the rear of the vehicle body with respect to a rear side edge of the battery module 82 and extends in the vehicle width direction.

The right frame 103 is arranged at a distance on a right side in the vehicle width direction with respect to a right side edge of the battery module 82, and extends from a right end portion of the front frame 101 toward the rear of the vehicle body. The right frame 103 and the rear frame 102 are connected by the right inclined frame 105.

In addition, the right frame 103 has a ladder-shaped cross section along the vehicle width direction and the up-down direction. Specifically, the right frame 103 includes a first right outer frame body 103a in which the cross section along the vehicle width direction and the up-down direction has a rectangular shape being slightly longer in the up-down direction, and a second right outer frame body (one end) 103b which protrudes outward in the vehicle width direction from a lower portion of the first right outer frame body 103a on an outer surface 103j and in which the cross section along the vehicle width direction and the up-down direction has a rectangular shape being long in the vehicle width direction, the first right outer frame body 103a and the second right outer frame body 103b being integrally molded.

At a center of the first right outer frame body 103a in the up-down direction, a first middle plate 103c is arranged in which the cross section along the vehicle width direction and the up-down direction extends in the vehicle width direction. A first bottom plate 103d of the first right outer frame body 103a extends inclinedly downward toward the right outer side in the vehicle width direction. On the first bottom plate 103d, a frame horizontal portion (second horizontal portion) 103f is formed to extend inward in the vehicle width direction from an inner surface 103e of the first right outer frame body 103a on the inner side in the vehicle width direction. The frame horizontal portion 103f is along the vehicle width direction. That is, the first right outer frame body 103a has a frame bent portion (second bent portion) 103g formed at a connection portion between the first bottom plate 103d and the frame horizontal portion 103f. Here, the frame bent portion 103g and the cross member bent portion 45i formed on the right second floor cross member 45 and the right third floor cross member 46 are arranged side by side in the up-down direction.

A second bottom plate 103i of the second right outer frame body 103b is smoothly connected to the first bottom plate 103d. At a center of the second right outer frame body 103b in the vehicle width direction, a second middle plate 103h is arranged in which the cross section along the vehicle width direction and the up-down direction extends in the up-down direction. The first middle plate 103c and the second middle plate 103h reinforce the first right outer frame body 103a and the second right outer frame body 103b.

The second right outer frame body 103b is attached from below to a lower end 31g of the inner panel 31f in the right side sill 31 via a fixing bolt 165. The fixing bolt 165 is screwed in from below, penetrates the lower end 31g of the inner panel 31f, and protrudes into the inner panel 31f. The extension portion 164a of the bulkhead 164 is joined to a protruding location of the fixing bolt 165.

The left frame 104 is arranged at a distance on a left side in the vehicle width direction with respect to a left side edge of the battery module 82, and extends from a left end portion of the front frame 101 toward the rear of the vehicle body. The left frame 104 and the rear frame 102 are connected by the left inclined frame 106.

In addition, the left frame 104 has a ladder-shaped cross section along the vehicle width direction and the up-down direction. Specifically, the left frame 104 includes a first left outer frame body 104a in which the cross section along the vehicle width direction and the up-down direction has a rectangular shape being slightly longer in the up-down direction, and a second left outer frame body (one end) 104b which protrudes outward in the vehicle width direction from a lower portion of the first left outer frame body 104a on an outer surface 104j and in which the cross section along the vehicle width direction and the up-down direction has a has a rectangular shape being long in the vehicle width direction, the first left outer frame body 104a and the second left outer frame body 104b being integrally molded.

At a center of the first left outer frame body 104a in the up-down direction, a first middle plate 104c is arranged in which the cross section along the vehicle width direction and the up-down direction extends in the vehicle width direction. A first bottom plate 104d of the first left outer frame body 104a extends inclinedly downward toward the left outer side in the vehicle width direction. On the first bottom plate 104d, a frame horizontal portion (second horizontal portion) 104f is formed to extend inward in the vehicle width direction from an inner surface 104e of the first left outer frame body 104a on the inner side in the vehicle width direction. The frame horizontal portion 104f is along the vehicle width direction. That is, the first left outer frame body 104a has a frame bent portion (second bent portion) 104g formed at a connection portion between the first bottom plate 104d and the frame horizontal portion 104f. Here, the frame bent portion 104g and the cross member bent portion 45i formed on the left second floor cross member 45 and the left third floor cross member 46 are arranged side by side in the up-down direction.

A second bottom plate 104i of the second left outer frame body 104b is smoothly connected to the first bottom plate 104d. At a center of the second left outer frame body 104b in the vehicle width direction, a second middle plate 104h is arranged in which the cross section along the vehicle width direction and the up-down direction extends in the up-down direction. The first middle plate 104c and the second middle plate 104h reinforce the first left outer frame body 104a and the second left outer frame body 104b.

The second left outer frame body 104b is attached from below to a lower end 31g of the inner panel 31f in the left side sill 31 via a fixing bolt 165. The fixing bolt 165 is screwed in from below, penetrates the lower end 31g of the inner panel 31f, and protrudes into the inner panel 31f. The extension portion 164a of the bulkhead 164 is joined to a protruding location of the fixing bolt 165.

As shown in FIGS. 3 and 9, the case frame portion 91 is formed in a substantially rectangular frame shape in a plan view by the front frame 101, the rear frame 102, the left frame 104, the right frame 103, the right inclined frame 105, and the left inclined frame 106. The case frame portion 91 is formed in a manner of covering an outer periphery of the battery module 82 at a distance.

As shown in FIGS. 8 to 10, the case frame portion 91 is attached to an outer periphery of the case portion 92. The case portion 92 is attached to the inside of the case frame portion 91 and is arranged below the battery module 82.

Specifically, the case portion 92 has a case bottom (a bottom surface of the battery pack 20) 108 and a case peripheral wall 109. The case bottom 108 is arranged below the battery module 82 and is formed in a substantially rectangular shape in a plan view. The case bottom 108 forms the bottom of the battery case 81. The case peripheral wall 109 is formed along an outer periphery of the case bottom 108. The case peripheral wall 109 has a case front wall 112, a case rear wall 113, a case right wall 114, and a case left wall 115. The case portion 92 is provided with the lower cross member 93, a plurality of the first longitudinal frames 94, and a plurality of the second longitudinal frames 95.

The lower cross member 93 is arranged at the center of the case portion 92 in the front-rear direction of the vehicle body, and is extended toward the vehicle width direction. For example, in the lower cross member 93, a right end portion 93a is in contact with the case right wall 114, and a left end portion 93b is in contact with the case left wall 115.

On the case bottom 108, a plurality of the first longitudinal frames 94 are arranged at intervals in the vehicle width direction in the vehicle body front of the lower cross member 93. On the case bottom 108, a plurality of the second longitudinal frames 95 are arranged at intervals in the vehicle width direction at the vehicle body rear of the lower cross member 93.

The plurality of first longitudinal frames 94 and the plurality of second longitudinal frames 95 are arranged in a manner of being spaced apart on the same line in the front-rear direction of the vehicle body. The lower cross member 93 is arranged between the plurality of first longitudinal frames 94 and the plurality of second longitudinal frames 95.

In the embodiment, one lower cross member 93 is illustrated, but the number of the lower cross member 93 can be selected as appropriate. In addition, in the embodiment, five first longitudinal frames 94 and five second longitudinal frames 95 are illustrated, but the number of the first longitudinal frame 94 and the number of the second longitudinal frame 95 can be selected as appropriate.

A front end portion 94a of the first longitudinal frame 94 is attached to the front frame 101 by a first mounting bracket 117 via the case bottom 108. In addition, a rear end portion 94b of the first longitudinal frame 94 is attached to the lower cross member 93.

A battery 85 is arranged longitudinally between a pair of adjacent first longitudinal frames 94, and the longitudinally arranged battery 85 is supported by the pair of first longitudinal frames 94.

A rear end portion 95a of the second longitudinal frame 95 is attached to the rear frame 102 by a second mounting bracket 118 via the case bottom 108. In addition, a front end portion 95b of the second longitudinal frame 95 is attached to the lower cross member 93.

The battery 85 is arranged longitudinally between a pair of adjacent second longitudinal frames 95, and the longitudinally arranged battery 85 is supported by the pair of second longitudinal frames 95.

The battery 85 is formed into a longitudinally elongated rectangular body by stacking a plurality of battery cells (not shown) in a longitudinal direction. Hereinafter, the longitudinally elongated battery 85 may also be referred to as "longitudinal battery 85".

In addition, a longitudinal arrangement of the longitudinal battery 85 refers to an arrangement of the battery 85 with a longitudinal direction of the battery 85 directed toward the front-rear direction of the vehicle body (longitudinal direction).

(Battery Module)

In the vehicle body front of the lower cross member 93, the plurality of first longitudinal frames 94 support a plurality of front batteries 85 in longitudinal arrangement in a row along the vehicle width direction. At the vehicle body rear of the lower cross member 93, the plurality of second longitudinal frames 95 support a plurality of rear batteries 85 in longitudinal arrangement in a row along the vehicle width direction. A front battery unit is constituted by the plurality of the front batteries 85, and a rear battery unit is constituted by the plurality of the rear batteries 85.

Two rows of the front battery unit and the rear battery unit are arranged side by side in the front-rear direction of the vehicle body. The front battery unit (that is, the plurality of front batteries 85) and the rear battery unit (that is, the plurality of rear batteries 85) constitute, for example, the battery module 82 for driving.

The battery module 82 is supported by the plurality of first longitudinal frames 94 and the plurality of second longitudinal frames 95 in a state in that the plurality of batteries 85 are arranged longitudinally with the longitudinal direction of the battery 85 directed toward the front-rear direction of the vehicle body.

In the embodiment, an example has been described in which the plurality of front batteries 85 and the plurality of rear batteries 85 are arranged in pairs in the front-rear direction of the vehicle body, but the disclosure is not limited thereto. As another example, the plurality of front batteries 85 and the plurality of rear batteries 85 may be arranged in three or more rows in the front-rear direction of the vehicle body.

The battery module 82 has, among the plurality of batteries 85, a first boundary portion 121 set between each row of the batteries 85 and extending in the vehicle width direction and a second boundary portion 122 (the second boundary portion 122 at the center in the vehicle width direction is not shown) extending in the front-rear direction of the vehicle body. The first boundary portion 121 extends in the vehicle width direction along the lower cross member 93. In other words, the lower cross member 93 is arranged between each row of batteries 85. The second boundary portion 122 extends in the front-rear direction of the vehicle body along the first longitudinal frame 94 and the second longitudinal frame 95.

The upper cross member 96 is arranged above the battery module 82 at a position corresponding to the first boundary portion 121. In other words, the upper cross member 96 is arranged between each row of batteries 85.

Figure 11:
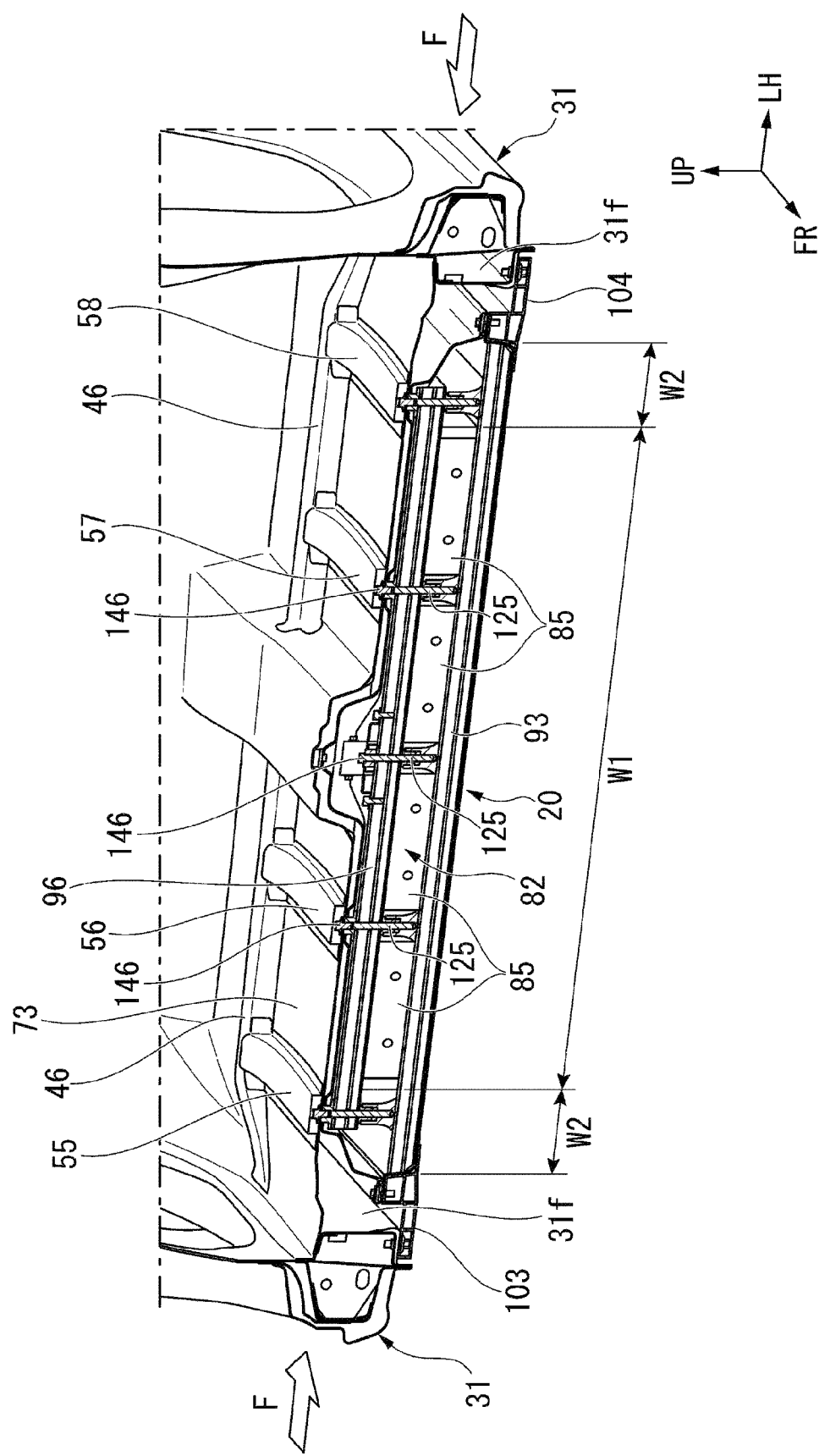
FIG. 11 is a perspective view in which the vehicle equipped with a battery pack according to the embodiment of the disclosure is cut at a first boundary portion of the battery pack.
Figure 12:
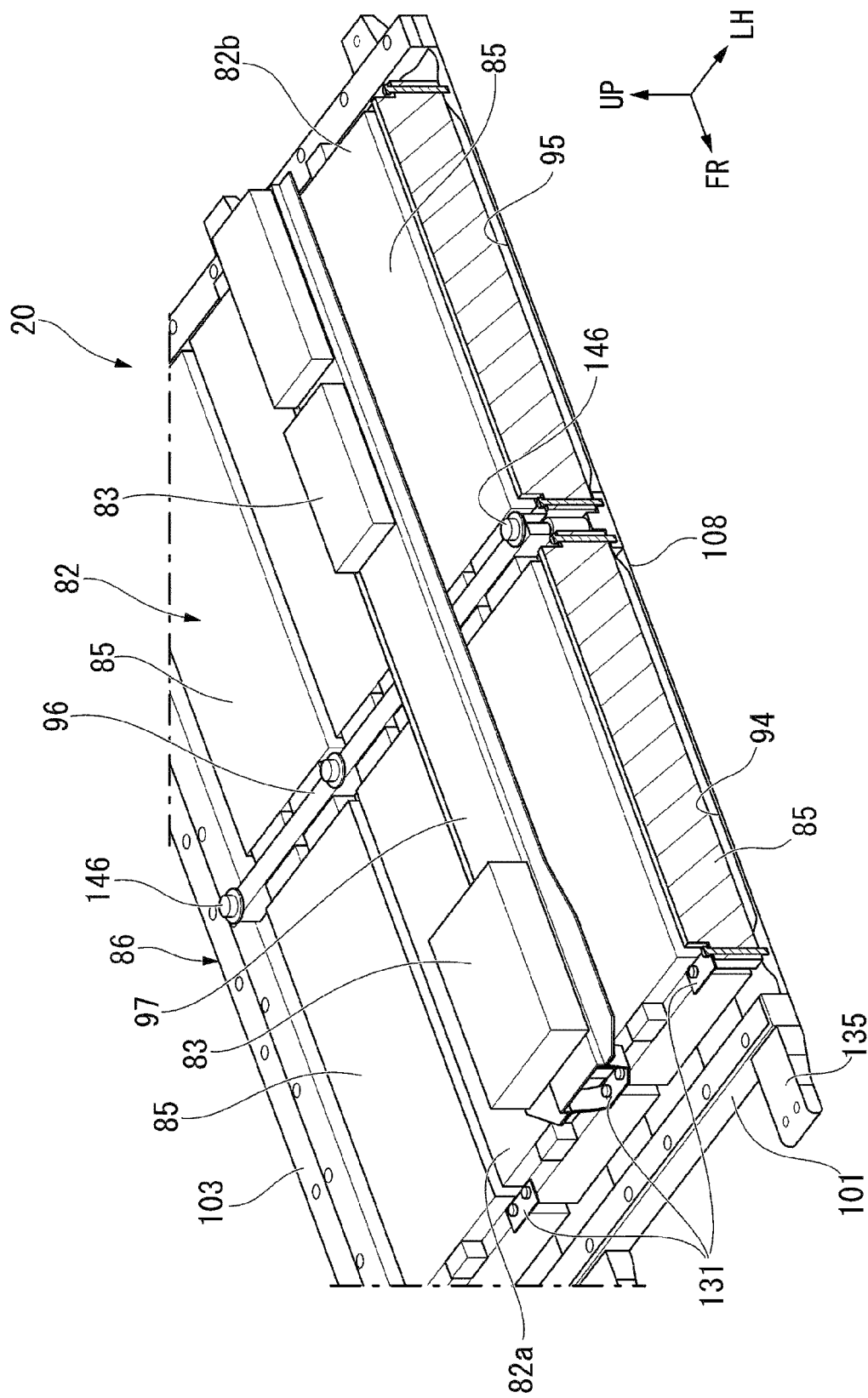
FIG. 12 is a perspective view in which the battery pack according to the embodiment of the disclosure is cut at a second boundary portion.
Figure 13:
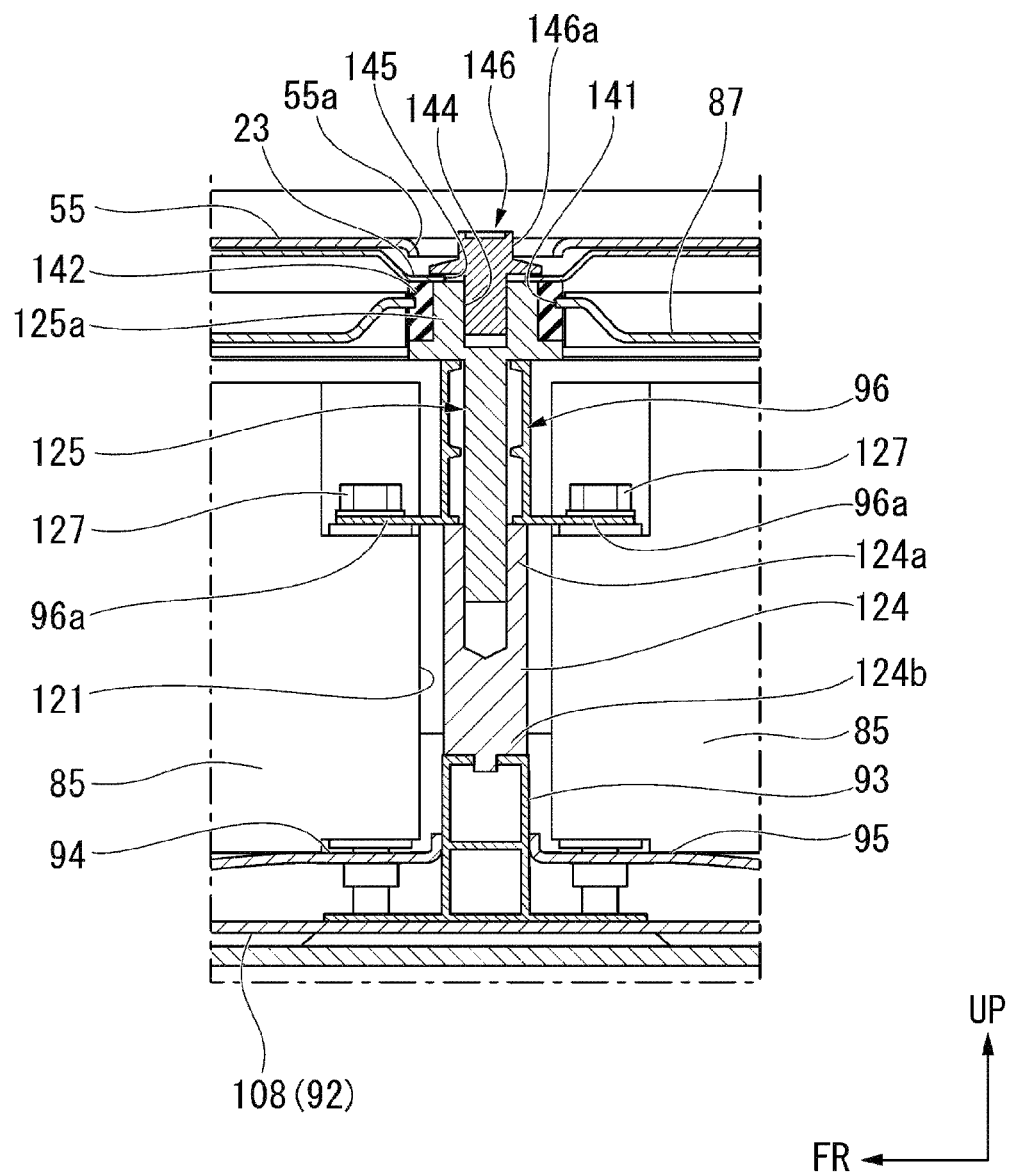
FIG. 13 is a cross-sectional view taken along line XIII-XIII in FIG. 2.

FIG. 11 is a perspective view in which the vehicle Ve equipped with a battery pack is cut at the first boundary portion 121 of the battery pack 20. FIG. 12 is a perspective view in which the battery pack 20 is cut at the second boundary portion 122. FIG. 13 is a cross-sectional view of the vehicle Ve equipped with a battery pack taken along line XIII-XIII in FIG. 2.

As shown in FIGS. 4, 11 to 13, the upper cross member 96 is arranged along the lower cross member 93. A length of the upper cross member 96 in the vehicle width direction is shorter than a length of the lower cross member 93 in the vehicle width direction. Therefore, the lower cross member 93 protrudes further outward in the vehicle width direction from the upper cross member 96.

A location of the upper cross member 96 facing the first to fourth floor longitudinal frames 55 to 58 in the up-down direction is coupled to an upper end portion 124a of an upper and lower connecting collar 124 by a mounting bolt (coupling member) 125. A lower end portion 124b of the upper and lower connecting collar 124 is coupled to the lower cross member 93. Therefore, the upper cross member 96 is coupled to the lower cross member 93 via the mounting bolt 125 and the upper and lower connecting collar 124.

In this state, a flange 96a of the upper cross member 96 is coupled to the battery 85 by a mounting bolt 127. Thereby, the plurality of batteries 85 are fixed from above by the upper cross member 96. Specifically, the upper cross member 96 connects the plurality of batteries 85 arranged in the front-rear direction of the vehicle body and also connects the plurality of batteries 85 arranged in the vehicle width direction at the center of the battery module 82 in the front-rear direction of the vehicle body.

In addition, the plurality of batteries 85 arranged in the vehicle width direction are connected at a front end portion 82a of the battery module 82 by a front connecting bracket 131 (see also FIG. 7). Furthermore, the plurality of batteries 85 arranged in the vehicle width direction are connected at a rear end portion 82b of the battery module 82 by a rear connecting bracket 132 (see FIG. 7).

In addition, a female screw portion 144 is formed on a head 125a of the mounting bolt 125. By screwing a mounting bolt (coupling member) 146 into the female screw portion 144, the case cover 87 and the first to fourth floor longitudinal frames 55 to 58 are fastened and fixed to the head 125a of the mounting bolt 125 (details are described later). That is, the lower cross member 93, the upper cross member 96, and the first to fourth floor longitudinal frames 55 to 58 are connected in the up-down direction via the mounting bolt 125 and the mounting bolt 146.

(Battery Accessory)

Above the plurality of batteries 85, the upper deck 97 is arranged at the second boundary portion 122 (not shown) at the center of the plurality of second boundary portions 122 in the vehicle width direction. The upper deck 97 is provided with the battery accessory 83 such as a high-voltage junction board, an electronic control unit (ECU, control device), or the like.

A high-voltage junction board is, for example, an accessory that supplies electricity of the battery module 82 for driving to a drive motor (not shown). The ECU is, for example, a battery management unit that controls discharge and charge between the battery module 82 for driving and the drive motor.

(Electric Wiring)

As shown in FIG. 9, the electrical wiring 84 is arranged in a space of the first boundary portion 121 of the battery module 82 and a space of the second boundary portion 122 at the center in the vehicle width direction.

In the embodiment, an example has been described in which the electrical wiring 84 is arranged in the space of the first boundary portion 121 and the space of the second boundary portion 122, but the disclosure is not limited thereto. As another example, the electrical wiring 84 may be arranged in one of the space of the first boundary portion 121 and the space of the second boundary portion 122.

Figure 14:
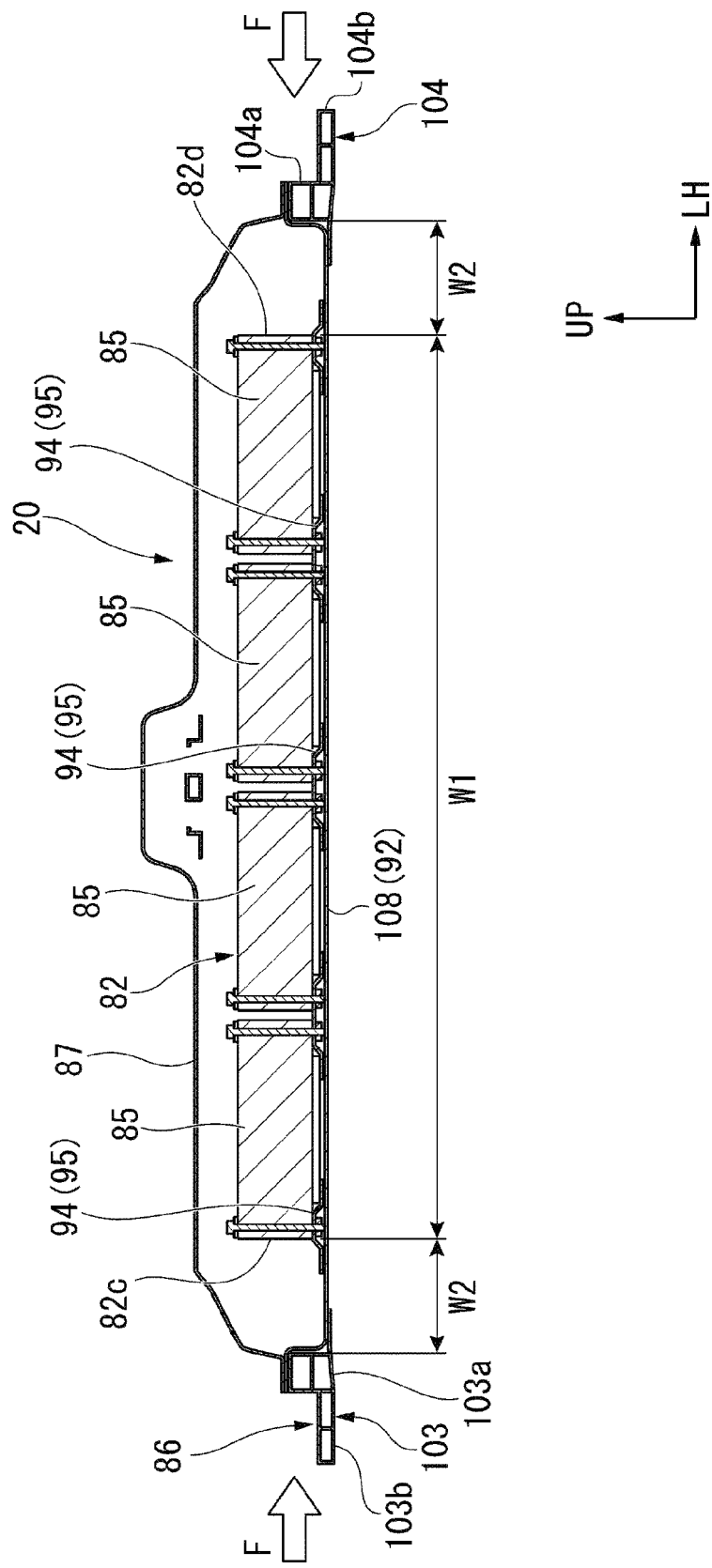
FIG. 14 is a cross-sectional view of the battery pack according to the embodiment of the disclosure taken along the first boundary portion.

FIG. 14 is a cross-sectional view of the battery pack 20 taken along the first boundary portion 121.

As shown in FIGS. 8, 9, and 14, the case cover 87 is attached to the case frame 91 from above in a state that the battery module 82, the battery accessory 83, and the electrical wiring 84 are accommodated in the case body 86. Thereby, the battery pack 20 is assembled and attached under the floor of the vehicle Ve equipped with a battery pack.

Here, for example, in the battery module 82 in which a plurality of the batteries 85 are arranged in the vehicle width direction and a pair of the batteries 85 is arranged in the front-rear direction of the vehicle body, terminals of the batteries 85 can be arranged toward the first boundary portion 121. Therefore, in the space of the first boundary portion 121, each terminal can be concentrated in the center of the battery pack 20 by passing a wire in the vehicle width direction while connecting each battery 85 toward the center of the vehicle width direction. Furthermore, the left and right second floor cross members 45 are arranged in the vehicle body front direction of the first boundary portion 121, and the left and right third floor cross members 46 are arranged in the vehicle body rear direction of the first boundary portion 121.

Here, for example, the battery pack 20 is provided with the upper cross member 96 above the first boundary portion 121. Therefore, each terminal concentrated in the center of the battery pack 20 is pulled out above the upper cross member 96 and is connected to a high-voltage component part such as the battery accessory 83 arranged in the front-rear direction of the vehicle body, and the wire is passed to the front of the vehicle body to arrange the electrical wiring (high voltage wiring) 84, and thereby the wire can be shortened. By shortening the wire, cost reduction and weight reduction can be achieved. In addition, because the wire is passed through a highly rigid portion of the battery pack 20 provided with the upper cross member 96, damage to the wiring can be suppressed when the vehicle body (specifically, the battery pack) vibrates.

As shown in FIG. 3, the battery pack 20 configured in this way has a center of gravity of pack Gi located approximately in the center in the vehicle width direction and approximately in the center in the front-rear direction of the vehicle body in a plan view. The center of gravity of pack Gi of the battery pack 20 is located at the rear of a center of gravity of vehicle Gb of the entire vehicle in the vehicle body. The center of gravity of vehicle Gb of the entire vehicle is a center of gravity including all of the vehicle body 10, the motor (not shown), the battery pack 20, and the like.

(Assembly of Battery Pack Under Floor of Vehicle)

As shown in FIGS. 3 and 11, the right frame 103 of the case body 86 is attached to the right side sill 31 from below. The left frame 104 of the case body 86 is attached to the left side sill 31 from below. The front frame 101 of the case body 86 is connected to a pair of branch portions 38 via a pair of front support brackets 135 (see also FIG. 10). The rear frame 102 of the case body 86 is connected to a frame rear cross member 138 via a pair of rear support brackets 136 (see also FIG. 10).

As shown in FIGS. 2, 4 and 13, the head 125a of the mounting bolt 125 penetrates a through hole 141 of the case cover 87 and is in contact with the floor panel 23 on the upper side. In addition, a rubber member 142 arranged on the head 125a also penetrates the through hole 141 of the case cover 87 and is in contact with the floor panel 23 on the upper side.

A female screw 144 of the head 125a is arranged downward to fit in a mounting hole 145 of the floor panel 23. The mounting bolt 146 is screwed to the female screw 144 of the head 125a through the mounting hole 145 of the floor panel 23. A head 146a of the mounting bolt 146 protrudes upward from through holes 55a to 58a on the top of the first to fourth floor longitudinal frames 55 to 58.

Here, the left and right flanges of the first to fourth floor longitudinal frames 55 to 58 are joined to the floor panel 23. Therefore, the battery pack 20 is fixed to the first to fourth floor longitudinal frames 55 to 58 via the floor panel 23.

Thereby, the battery pack 20 is assembled under the floor of the vehicle Ve equipped with a battery pack. In this state, the plurality of batteries 85 of the battery module 82 accommodated in the battery pack 20 are arranged longitudinally with the longitudinal direction of the battery directed toward the front-rear direction of the vehicle body (see also FIG. 9).

As shown in FIGS. 3 and 10, the right front support bracket 135 is coupled, via the front frame 101, to a first longitudinal frame 94 of the plurality of first longitudinal frames 94 that is located in the second position from the right outer side toward the inner side in the vehicle width direction (hereinafter referred to as second right first longitudinal frame). The right front support bracket 135 is coupled to the rear end portion 38*a* of the right branch portion 38.

Thereby, the front end portion 94*a* of the second right first longitudinal frame 94 is coupled to the rear end portion 38*a* of the right branch portion 38 via the front frame 101 and the right front support bracket 135.

Here, in the front-rear direction of the vehicle body, the second right first longitudinal frame 94 is arranged on the same line as a second longitudinal frame 95 of the plurality of second longitudinal frames 95 that is located in the second position from the right outer side toward the inner side in the vehicle width direction (hereinafter referred to as second right second longitudinal frame).

In addition, the left front support bracket 135 is coupled, via the front frame 101, to a first longitudinal frame 94 of the plurality of first longitudinal frames 94 that is located in the second position from the left outer side toward the inner side in the vehicle width direction (hereinafter referred to as second left first longitudinal frame). The left front support bracket 135 is coupled to the rear end portion 38*a* of the left branch portion 38.

Thereby, the front end portion 94*a* of the second left first longitudinal frame 94 is coupled to the rear end portion 38*a* of the left branch portion 38 via the front frame 101 and the left front support bracket 135.

Here, in the front-rear direction of the vehicle body, the second left first longitudinal frame 94 is arranged on the same line as a second longitudinal frame 95 of the plurality of second longitudinal frames 95 that is located in the second position from the left outer side toward the inner side in the vehicle width direction (hereinafter referred to as second left second longitudinal frame).

The rear end portion 95*a* of a second longitudinal frame 95 of the plurality of second longitudinal frames 95 that is located on the right outer side in the vehicle width direction (hereinafter referred to as first right second longitudinal frame) is arranged (aligned) on an extension line 151 of the right rear frame 41.

Here, in the front-rear direction of the vehicle body, the first right second longitudinal frame 95 is arranged on the same line as a first longitudinal frame 94 of the plurality of first longitudinal frames 94 that is located in the first position from the right outer side toward the inner side in the vehicle width direction (hereinafter referred to as first right first longitudinal frame).

In addition, the rear end portion 95*a* of a second longitudinal frame 95 of the plurality of second longitudinal frames 95 that is located on the left outer side in the vehicle width direction (hereinafter referred to as first left second longitudinal frame) is arranged (aligned) on an extension line 152 of the left rear frame 41.

Here, in the front-rear direction of the vehicle body, the first left second longitudinal frame 95 is arranged on the same line as a first longitudinal frame 94 of the plurality of first longitudinal frames 94 that is located in the first position from the left outer side toward the inner side in the vehicle width direction (hereinafter referred to as first left first longitudinal frame).

(Operation of Vehicle Body at the Time of Side Collision)

Next, an operation of the vehicle body 10 when, for example, a load (hereinafter referred to as side collision load) F is input to a side portion of the vehicle body 10 due to a side collision is described.

As shown in FIG. 4, the side collision load F input to the vehicle body 10 is transmitted to the second floor cross member 45, the third floor cross member 46, the right frame 103, and the left frame 104 via the side sill 31 and the bulkhead 164 in the side sill 31.

Here, the cross member bent portions 45*i* and 46*i* are formed on the floor cross members 45 and 46, respectively. On the outer side of the cross member bent portions 45*i* and 46*i* in the vehicle width direction, the right end portions 45*a* and 46*a* and the left end portions 45*c* and 46*c* are bent and extended inclinedly downward toward the outer side in the vehicle width direction. Therefore, due to the side collision load F, the floor cross members 45 and 46 are respectively bent downward starting from the cross member bent portions 45*i* and 46*i* (see an arrow Y1 in FIG. 4). At this time, because the lower cross member 93 protrudes further outward than the upper cross member 96 in the vehicle width direction, a region (deformation region, deformation stroke region) that allows deformation of the floor cross members 45 and 46 is formed above the lower cross member 93. Therefore, the floor cross members 45 and 46 are sufficiently bent.

In addition, the frame bent portions 103*g* and 104*g* are formed on the frames 103 and 104, respectively. Furthermore, the frames 103 and 104 are respectively constituted by the two outer frame bodies 103*a* and 103*b*, and the two outer frame bodies 104*a* and 104*b*. Among the two outer frame bodies 103*a* and 103*b* and the two outer frame bodies 104*a* and 104*b*, the second right outer frame body 103*b* and the second left outer frame body 104*b* are located below the first right outer frame body 103*a* and the first left outer frame body 104*a*. Therefore, due to the side collision load F, the frames 103 and 104 are respectively bent in a manner of being folded starting from the frame bent portions 103*g* and 104*g*, which is specifically described below.

Figure 15:
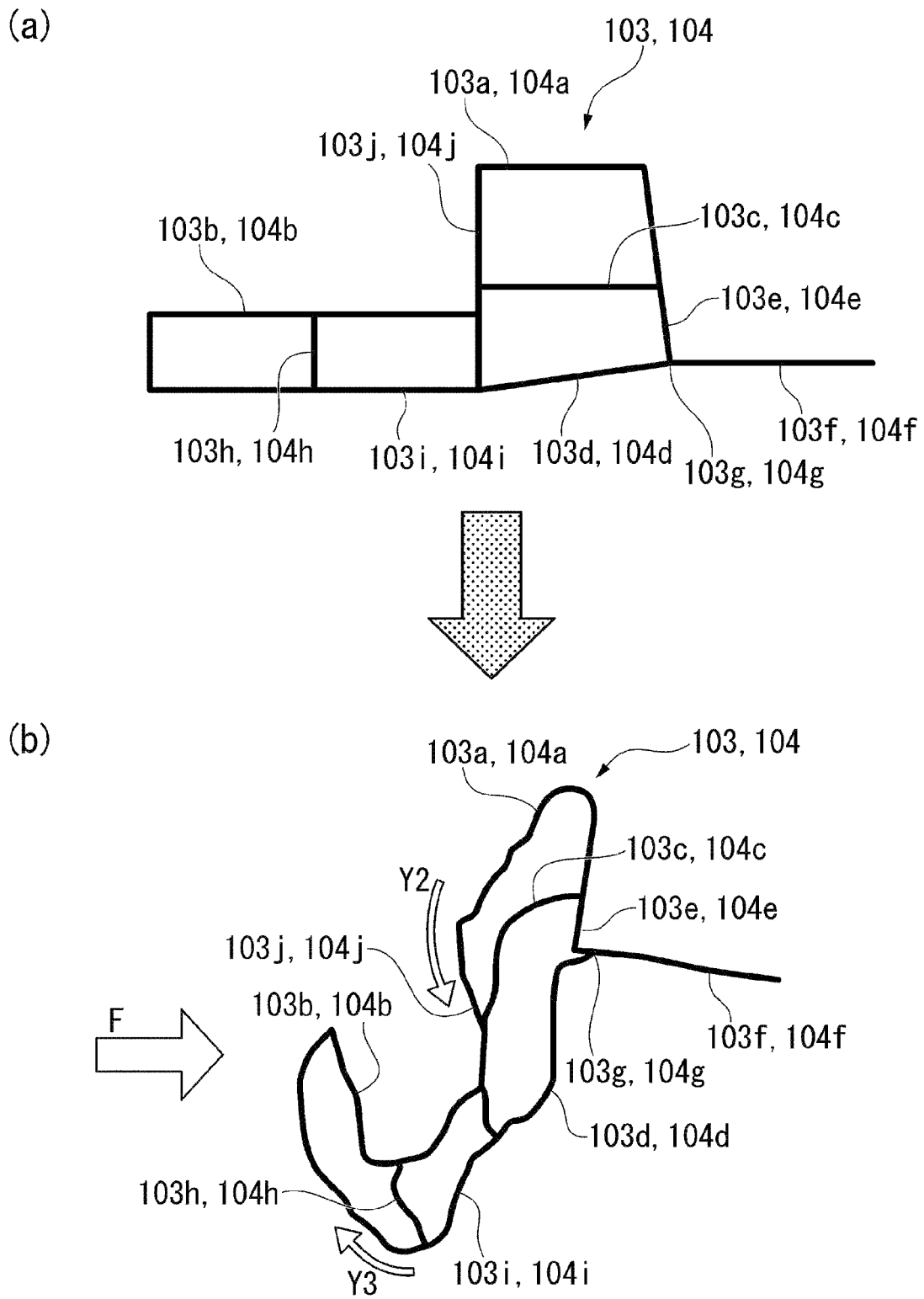
FIG. 15 is a simulation diagram showing a behavior of a right frame and a left frame when a side collision load is input according to the embodiment of the disclosure, (a) of FIG. 15 shows a case before the side collision load is input, and (b) of FIG. 15 shows a case after the side collision load has been input.

FIG. 15 is a simulation diagram showing a behavior of the right frame 103 and the left frame 104 when the side collision load F is input, (a) of FIG. 15 shows a case before the side collision load F is input, and (b) of FIG. 15 shows a case after the side collision load F has been input.

As shown in FIGS. 15(*a*) and 15(*b*), the bottom plates 103*d* and 104*d* of the first right outer frame body 103*a* and the first left outer frame body 104*a* extend inclinedly downward toward the outer side in the vehicle width direction. Therefore, when the side collision load F is input to each of the frames 103 and 104, the first right outer frame body 103*a* and the first left outer frame body 104*a* are bent downward starting from the frame bent portions 103*g* and 104*g* (see an arrow Y2 in (b) of FIG. 15).

In addition, the second right outer frame body 103*b* and the second left outer frame body 104*b* are arranged below the first right outer frame body 103*a* and the first left outer frame body 104*a*. Therefore, when the first right outer frame body 103a and the first left outer frame body 104a are bent downward, the first right outer frame body 103a and the first left outer frame body 104a are bent in a V-shape due to a momentum of these first right outer frame body 103a and the first left outer frame body 104a and the side collision load F (see an arrow Y3 in (b) of FIG. 15). In this way, each of the frames 103 and 104 is bent in a manner of being folded.

In this way, in the above embodiment, the floor cross members 45 and 46 include the cross member bent portions 45i and 46i, respectively. The frames 103 and 104 include the frame bent portions 103g and 104g, respectively. Therefore, at the time of a side collision, each of the floor cross members 45 and 46 and each of the frames 103 and 104 are bent starting from the cross member bent portions 45i and 46i and the frame bent portions 103g and 104g. Each of the floor cross members 45 and 46 and each of the frames 103 and 104 are crushed when being bent, and thereby the side collision load F is absorbed by each of the floor cross members 45 and 46 and each of the frames 103 and 104. In this way, a load direction of the side collision is distributed to bending directions of each of the floor cross members 45 and 46 and each of the frames 103 and 104 and the side collision load F is absorbed. Therefore, damage to the batteries 85 can be prevented even if a mechanical strength of the case cover 87 of the battery case 81 is reduced as compared with before. As a result, the vehicle body 10 can be made smaller and lighter.

Moreover, the cross member bent portions 45i and 46i and the frame bent portions 103g and 104g are arranged side by side in the up-down direction. In this way, because bending locations are aligned in the up-down direction, each of the floor cross members 45 and 46 and each of the frames 103 and 104 are more likely to bend than when the bending locations are not aligned in the up-down direction. Therefore, at the time of a side collision, each of the floor cross members 45 and 46 and each of the frames 103 and 104 can be crushed to reliably absorb the side collision load F.

Furthermore, the right end portion 33a and the left end portion 45c of each of the floor cross members 45 and 46, and the bottom plates 103i and 104i of each of the frames 103 and 104 have the same inclination direction. Therefore, each of the floor cross members 45 and 46 and each of the frames 103 and 104 can be easily bent.

In addition, the cross member inclined closed cross section 47 formed on the right end portion 33a and the left end portion 45c of each of the floor cross members 45 and 46 gradually decreases in a cross-sectional area from each of the cross member bent portions 45i and 46i toward the outside in the vehicle width direction. Therefore, for example, a structure bent easily when the structure receives the side collision load F can be obtained.

Moreover, the inclined closed cross section 49 is formed larger than the cross member inclined closed cross section 47. Therefore, for example, when the side collision load F is received, the right end portion 33a and the left end portion 45c of each of the floor cross members 45 and 46 can be easily bent downward.

Furthermore, the inclined member 48 straddling each of the floor cross members 45 and 46 and the side sill 31 is arranged. The upper end 48b (flange portion 48a) of the inclined member 48 is formed with an incline in a manner of corresponding to the right end portion 33a and the left end portion 45c of each of the floor cross members 45 and 46. Besides, the floor panel 23 is sandwiched between the right end portion 33a or the left end portion 45c of each of the floor cross members 45 and 46 and the inclined member 48.

By arranging the inclined member 48, the right end portion 33a and the left end portion 45c of each of the floor cross members 45 and 46, and a peripheral portion (the right end portion 33a and the left end portion 34a) of the floor panel 23 (the first floor portion 33 and the second floor portion 34) can be reliably supported. Therefore, the main floor portion 73 can be formed along each upper end 31e of the right side sill 31 and the left side sill 31, and the occupants 66 to 69 can easily get on and off.

In addition, the inclined member 48 can reliably support each of the floor cross members 45 and 46 and the floor panel 23, and the inclined member 48 can be easily and stably crushed together with each of the floor cross members 45 and 46 by, for example, the side collision load F. That is, because the upper end 48b of the inclined member 48 is formed with an incline, the inclined member 48 sufficiently receives a load of each of the floor cross members 45 and 46 that are bent downward by the side collision load F. Therefore, the inclined member 48 can be easily crushed.

The side sill 31 and the floor panel 23 are arranged below each of the floor cross members 45 and 46, and the right end portion 33a and the left end portion 45c of each of the floor cross members 45 and 46 extend inclinedly downward toward the outer side in the vehicle width direction. Therefore, a large space under the floor panel 23 can be secured, and a large battery case 81 can be mounted. As a result, the side collision load F can be sufficiently absorbed by each of the floor cross members 45 and 46 and the inclined member 48.

The upper end 48b of the inclined member 48 is arranged at a location directly below the seat fixing portion 45j on the lower surface 45h of the right second floor cross member 45. Therefore, the strength of the seat fixing portion 45j of the floor cross members 45 and 46 can be sufficiently secured with slight reinforcement. In addition, the inclined member 48 can be made sufficiently large, and the side collision load F can be sufficiently absorbed by the inclined member 48.

A location located in the front-rear direction of the flange portions 45g and 46g of each of the floor cross members 45 and 46 and a location located in the front-rear direction of the flange portion 48a of the inclined member 48 are overlapped and coupled to each other with the floor panel 23 (the first floor portion 33 and the second floor portion 34) sandwiched therebetween. Besides, when viewed from the front-rear direction, the cross member right end portion 45a and the inclined member 48 form a trapezoidal shape. Therefore, the supporting strength of a seat (not shown) by each of the floor cross members 45 and 46 and the inclined member 48 can be sufficiently increased. On the other hand, it is difficult to secure the mechanical strength of each of the floor cross member 45 and 46 and the inclined member 48 in a side collision direction.

Therefore, in the case of a side collision, each of the floor cross members 45 and 46 and the inclined member 48 can be easily bent, and the side collision load F can be sufficiently absorbed by each of the floor cross members 45 and 46 and the inclined member 48.

The bulkhead 164 arranged in each side sill 31 is provided with the extension portion 164a at a lower portion. The extension portion 164a faces the right end 48c of the inclined member 48 in the vehicle width direction. Furthermore, the extension portion 164a is joint to each of the frames 103 and 104 via the fixing bolt 165. Therefore, the weight of the side sill 31 is reduced, and the mechanical strength of the side sill 31 can be sufficiently secured by the bulkhead 164. In addition, the mechanical strength of the side sill 31 can be secured, and the side collision load F applied to the side sill 31 can be sufficiently transmitted to the inclined member 48 and each of the frames 103 and 104. As a result, end portions of the inclined member 48 and each of the frames 103 and 104 in the vehicle width direction can be easily crushed, and the side collision load F can be sufficiently absorbed by the inclined member 48 and each of the frames 103 and 104.

In addition, in the floor tunnel 24, the brace reinforcing portion 160 is arranged at a location where each of the floor cross members 45 and 46 is joined. The brace reinforcing portion 160 joins a left flange portion 24e of both flange portions 24e in the vehicle width direction of the floor tunnel 24 with the central end portion 45f of the right second floor cross member 45 and the central end portion 46f of the right third floor cross member 46. Furthermore, the brace reinforcing portion 160 joins a right flange portion 24e of both flange portions 24e in the vehicle width direction of the floor tunnel 24 with the central end portion 45f of the left second floor cross member 45 and the central end portion 46f of the left third floor cross member 46. Therefore, the load applied to either one of the left and right floor cross members 45 and 46 at the time of a side collision can be linearly transmitted to the other one of the floor cross members 45 and 46. Correspondingly, the entire floor cross members 45 and 46 can receive the load caused by the side collision, and the damage to the floor tunnel 24 can also be suppressed.

As for the lower cross member 93 and the upper cross member 96 constituting the battery case 81, the lower cross member 93 protrudes further outward than the upper cross member 96 in the vehicle width direction. Therefore, a region (deformation region, deformation stroke region) that allows deformation of the floor cross members 45 and 46 is formed above the lower cross member 93. Therefore, because the floor cross members 45 and 46 are sufficiently bent, the side collision load F can be sufficiently absorbed by the floor cross members 45 and 46.

In addition, it is possible to avoid interference between the battery case 81 and members (the floor cross members 45 and 46, and the like) that are crushed toward the battery case 81 side by the upper cross member 96 having a short length in the vehicle width direction. Therefore, the batteries 85 can be reliably protected at the time of a side collision.

In addition, a plurality of first to fourth floor longitudinal frames (floor frames) 55 to 58 are arranged at intervals on the floor panel 23 in the vehicle width direction. The lower cross member 93, the upper cross member 96, and the first to fourth floor longitudinal frames 55 to 58 are connected in the up-down direction via the mounting bolt 125 and the mounting bolt 146. Therefore, the lower cross member 93, the upper cross member 96, and the first to fourth floor longitudinal frames 55 to 58 can be integrated. Thus, the arrangement of the lower cross member 93, the upper cross member 96, and the first to fourth floor longitudinal frames 55 to 58 can be easily changed, and the workability of assembling to various vehicle bodies can be improved. In addition, the battery case 81 can be shared with various vehicle bodies. Furthermore, the lower cross member 93, the upper cross member 96, and the first to fourth floor longitudinal frames 55 to 58 can be integrated. Therefore, an impact resistance of the lower cross member 93, the upper cross member 96, and the first to fourth floor longitudinal frames 55 to 58 at the time of a side collision can be improved.

The lower cross member 93 and the upper cross member 96 are arranged between each row of the battery 85. Therefore, it is possible to reliably prevent the side collision load F from being received by the lower cross member 93 and the upper cross member 96 and being transmitted to the battery 85. As a result, the battery case 81 can be more reliably made smaller and lighter.

In addition, by arranging the center of gravity of pack Gi of the battery pack 20 at the rear of the center of gravity of vehicle Gb in the vehicle body, the side collision load F input to a side portion of the vehicle due to a side collision can be changed to a rotational moment M1 centered on the center of gravity of vehicle Gb.

In this way, by setting a large space W2 of the deformation stroke region and changing the side collision load F to the rotational moment M1, it is possible to eliminate the need for reinforcement of the vehicle body 10 for example. Therefore, the deformation of the battery pack 20 can be suppressed without increasing the weight of the vehicle body 10.

Because the battery 85 is arranged longitudinally, the space W2 of the deformation stroke region that allows deformation caused by the side collision load F can be set large.

Furthermore, the battery accessory 83 is arranged on an upper portion of the battery module 82 at the center in the vehicle width direction and between the plurality of batteries 85 (that is, the second boundary portion 122 at the center in the vehicle width direction (not shown)). Therefore, a width dimension W1 of the battery module 82 in the vehicle width direction can be kept small without impairing a capacity of the battery module 82. Thereby, the space W2 of the deformation stroke region can be reliably set large.

In addition, the left and right second floor cross members 45 are arranged in the vehicle body front direction of the first boundary portion 121, and the left and right third floor cross members 46 are arranged in the vehicle body rear direction of the first boundary portion 121. Therefore, electric components such as the terminal and the electric wiring 84 arranged at the first boundary portion 121 can be protected from, for example, the side collision load F input by a side collision.

Thereby, it is not necessary to arrange the electric wiring 84 or the terminal on the outer side of the battery module 82 in the vehicle width direction, so that the space W2 of the deformation stroke region can be set even larger.

In addition, a plurality of first longitudinal frames 94 and a plurality of second longitudinal frames 95 are arranged at intervals toward the front-rear direction of the vehicle body on the case bottom 108 of the case portion 92 in the front-rear direction of the vehicle body. Furthermore, the lower cross member 93 is arranged between the plurality of first longitudinal frames 94 and the plurality of second longitudinal frames 95.

Therefore, in case regions in the vehicle body front of and at the vehicle body rear of the lower cross member 93, the plurality of longitudinal batteries 85 can be longitudinally arranged toward the front-rear direction of the vehicle body along the plurality of first longitudinal frames 94 and the plurality of second longitudinal frames 95. Thereby, the plurality of longitudinal batteries 85 can be arranged longitudinally in an efficient manner, and a sufficient cruising distance can thus be secured.

In addition, the plurality of batteries 85 are placed on the plurality of first longitudinal frames 94 and the plurality of second longitudinal frames 95. Furthermore, the plurality of batteries 85 (that is, the battery modules 82) are fixed from above by the upper cross member 96. Specifically, the plurality of batteries 85 are connected from above in the front-rear direction of the vehicle body and the vehicle width direction by the upper cross member 96 at the central portion of the battery module 82 in the front-rear direction of the vehicle body. In addition, the front end portion 82*a* of the battery module 82 is connected by the front connecting bracket 131 in the vehicle width direction. Furthermore, the rear end portion 82*b* of the battery module 82 is connected by the rear connecting bracket 132 in the vehicle width direction.

Thereby, the plurality of longitudinal batteries 85 (that is, the battery module 82) can be stably fixed, and the battery module 82 can be integrally connected in a state that the rigidity is secured.

Moreover, the technical scope of the disclosure is not limited to the above embodiment, and various modifications can be made without departing from the spirit of the disclosure.

For example, in the above embodiment, the left and right side sills 31 have been described as an example of the side portion of the vehicle body 10 in the vehicle width direction. Besides, a case that the left and right second floor cross members 45, the left and right third floor cross members 46, the right frame 103, and the left frame 104 are connected to these side sills 31 has been described. However, the left and right second floor cross members 45, the left and right third floor cross members 46, the right frame 103, and the left frame 104 may be connected to any side portion of the vehicle body 10 in the vehicle width direction, and are not limited to being connected only to the side sill 31.

In addition, in the above embodiment, a case that the right end portion 45*a* and the left end portion 46*a* are bent and extended inclinedly downward toward the outer side in the vehicle width direction from the cross member horizontal portions 45*e* and 46*e* via the cross member bent portions 45*i* and 46*i* has been described. However, the bending direction is not limited to the downward direction, and each of the end portions 45*a* and 46*a* may be bent and extended inclinedly upward via the cross member bent portions 45*i* and 46*i*.

Furthermore, in the above embodiment, a case that the first bottom plate 103*d* of the first right outer frame body 103*a* and the first bottom plate 104*d* of the first left outer frame body 104*a* are bent and extended inclinedly downward toward the outer side in the vehicle width direction via the corresponding frame bent portions 103*g* and 104*g*, respectively. However, the bending direction is not limited to the downward direction, and each of the bottom plates 103*d* and 104*d* may be bent and extended inclinedly upward via the frame bent portions 103*g* and 104*g*.

The bending direction of each of the end portions 45*a* and 46*a* of each of the floor cross members 45 and 46 and the bending direction of the first bottom plates 103*d* and 104*d* of each of the frames 103 and 104 may be different. Even in this configuration, if the cross member bent portions 45*i* and 46*i* and the frame bent portions 103*g* and 104*g* are arranged side by side in the up-down direction, the same effect as that of the above embodiment can be obtained.

In the above embodiment, a case that the lower cross member 93, the upper cross member 96, and the first to fourth floor longitudinal frames 55 to 58 are connected in the up-down direction via the mounting bolt 125 and the mounting bolt 146 has been described. However, the member that couples the lower cross member 93, the upper cross member 96, and the first to fourth floor longitudinal frames 55 to 58 are not limited to the mounting bolts 125 and 146, and may be any member that can couple the lower cross member 93, the upper cross member 96, and the first to fourth floor longitudinal frames 55 to 58. For example, a screw or the like may be used instead of the mounting bolts 125 and 146.

In addition, it is possible to replace component elements in the above embodiment with well-known component elements as appropriate without departing from the spirit of the disclosure, and the modifications described above may be appropriately combined.

What is claimed is:

1. A vehicle body structure, comprising:
    a floor cross member which extends along a vehicle width direction of a vehicle body and in which one end in the vehicle width direction is connected to a side portion of the vehicle body in the vehicle width direction;
    a battery arranged below the floor cross member;
    a battery case which stores the battery and in which one end in the vehicle width direction is connected via a side frame at the side portion of the vehicle body in the vehicle width direction and below the floor cross member;
    a first bent portion formed on a side of the one end of the floor cross member and bent inclinedly in an up-down direction from a first horizontal portion extending along the vehicle width direction toward an outer side in the vehicle width direction; and
    a second bent portion formed on the side frame and bent inclinedly in the up-down direction from a second horizontal portion extending along the vehicle width direction toward the outer side in the vehicle width direction,
    wherein the first bent portion and the second bent portion are arranged side by side in the up-down direction.

2. The vehicle body structure according to claim 1, wherein the floor cross member is formed in a closed cross section, extends inclinedly downward as a cross-sectional area is gradually reduced from the first bent portion toward the outer side in the vehicle width direction, and is fixed to a floor panel and a side sill of the vehicle body arranged below the floor cross member;
    the vehicle body structure comprises a gusset arranged in a manner of straddling an inner surface of an inner side of the side sill in the vehicle width direction and a lower surface of the floor cross member; and
    the gusset is formed with an incline in a manner that an upper end corresponds to a shape of the floor cross member on the outer side of the first bent portion in the vehicle width direction, and cooperates with the floor cross member to sandwich an outer portion of the floor panel in the vehicle width direction from the up-down direction.

3. The vehicle body structure according to claim 2, wherein the floor cross member has a seat fixture for fixing a seat arranged on the floor cross member; and
    the gusset extends until the upper end of the gusset on a side of the floor cross member is directly below the seat fixing portion.

4. The vehicle body structure according to claim 2, wherein the floor cross member and the gusset have a U-shaped cross section along a front-rear direction and the up-down direction;
    a flange portion of the floor cross member in the front-rear direction and a flange portion of the gusset in the front-rear direction are overlapped to be coupled to each other; and
    the floor cross member and the gusset form a trapezoidal shape when viewed from the front-rear direction.

5. The vehicle body structure according to claim 3, wherein the floor cross member and the gusset have a U-shaped cross section along a front-rear direction and the up-down direction;

a flange portion of the floor cross member in the front-rear direction and a flange portion of the gusset in the front-rear direction are overlapped to be coupled to each other; and the floor cross member and the gusset form a trapezoidal shape when viewed from the front-rear direction.

6. The vehicle body structure according to claim 2, wherein the side sill is formed in a closed cross section;
the vehicle body structure comprises a bulkhead arranged on the outer side in the vehicle width direction in the side sill; and
a lower portion of the bulkhead is extended inward in the vehicle width direction and faces the gusset in the vehicle width direction, and is connected to the side frame of the battery case arranged on the side portion in the vehicle width direction.

7. The vehicle body structure according to claim 3, wherein the side sill is formed in a closed cross section;
the vehicle body structure comprises a bulkhead arranged on the outer side in the vehicle width direction in the side sill; and
a lower portion of the bulkhead is extended inward in the vehicle width direction and faces the gusset in the vehicle width direction, and is connected to the side frame of the battery case arranged on the side portion in the vehicle width direction.

8. The vehicle body structure according to claim 4, wherein the side sill is formed in a closed cross section;
the vehicle body structure comprises a bulkhead arranged on the outer side in the vehicle width direction in the side sill; and
a lower portion of the bulkhead is extended inward in the vehicle width direction and faces the gusset in the vehicle width direction, and is connected to the side frame of the battery case arranged on the side portion in the vehicle width direction.

9. The vehicle body structure according to claim 1, comprising:
a floor tunnel that extends in a front-rear direction; and
a brace reinforcing portion arranged in the floor tunnel;
wherein a plurality of the floor cross members are arranged on two sides sandwiching the floor tunnel; and
when viewed from the front-rear direction, the brace reinforcing portion is arranged in a manner of coupling a root portion of a left end of the floor tunnel to, on a right side, an end portion of the floor cross member on a center side in the vehicle width direction, and coupling a root portion of a right end of the floor tunnel to, on a left side, an end portion of the floor cross member on the center side in the vehicle width direction.

10. The vehicle body structure according to claim 2, comprising:
a floor tunnel that extends in a front-rear direction; and
a brace reinforcing portion arranged in the floor tunnel;
wherein a plurality of the floor cross members are arranged on two sides sandwiching the floor tunnel; and
when viewed from the front-rear direction, the brace reinforcing portion is arranged in a manner of coupling a root portion of a left end of the floor tunnel to, on a right side, an end portion of the floor cross member on a center side in the vehicle width direction, and coupling a root portion of a right end of the floor tunnel to, on a left side, an end portion of the floor cross member on the center side in the vehicle width direction.

11. The vehicle body structure according to claim 3, comprising:
a floor tunnel that extends in a front-rear direction; and
a brace reinforcing portion arranged in the floor tunnel;
wherein a plurality of the floor cross members are arranged on two sides sandwiching the floor tunnel; and
when viewed from the front-rear direction, the brace reinforcing portion is arranged in a manner of coupling a root portion of a left end of the floor tunnel to, on a right side, an end portion of the floor cross member on a center side in the vehicle width direction, and coupling a root portion of a right end of the floor tunnel to, on a left side, an end portion of the floor cross member on the center side in the vehicle width direction.

12. The vehicle body structure according to claim 4, comprising:
a floor tunnel that extends in a front-rear direction; and
a brace reinforcing portion arranged in the floor tunnel;
wherein a plurality of the floor cross members are arranged on two sides sandwiching the floor tunnel; and
when viewed from the front-rear direction, the brace reinforcing portion is arranged in a manner of coupling a root portion of a left end of the floor tunnel to, on a right side, an end portion of the floor cross member on a center side in the vehicle width direction, and coupling a root portion of a right end of the floor tunnel to, on a left side, an end portion of the floor cross member on the center side in the vehicle width direction.

13. The vehicle body structure according to claim 6, comprising:
a floor tunnel that extends in a front-rear direction; and
a brace reinforcing portion arranged in the floor tunnel;
wherein a plurality of the floor cross members are arranged on two sides sandwiching the floor tunnel; and
when viewed from the front-rear direction, the brace reinforcing portion is arranged in a manner of coupling a root portion of a left end of the floor tunnel to, on a right side, an end portion of the floor cross member on a center side in the vehicle width direction, and coupling a root portion of a right end of the floor tunnel to, on a left side, an end portion of the floor cross member on the center side in the vehicle width direction.

14. The vehicle body structure according to claim 1, wherein the battery case comprises:
an upper cross member that extends along the vehicle width direction; and
a lower cross member that extends along the vehicle width direction and is arranged below the upper cross member, and
one cross member of the upper cross member and the lower cross member protrudes further outward than the other cross member in the vehicle width direction.

15. The vehicle body structure according to claim 2, wherein the battery case comprises:
an upper cross member that extends along the vehicle width direction; and
a lower cross member that extends along the vehicle width direction and is arranged below the upper cross member, and
one cross member of the upper cross member and the lower cross member protrudes further outward than the other cross member in the vehicle width direction.

16. The vehicle body structure according to claim 3, wherein the battery case comprises:
an upper cross member that extends along the vehicle width direction; and a lower cross member that extends along the vehicle width direction and is arranged below the upper cross member, and one cross member of the upper cross member and the lower cross member protrudes further outward than the other cross member in the vehicle width direction.

17. The vehicle body structure according to claim 4, wherein the battery case comprises:

an upper cross member that extends along the vehicle width direction; and a lower cross member that extends along the vehicle width direction and is arranged below the upper cross member, and one cross member of the upper cross member and the lower cross member protrudes further outward than the other cross member in the vehicle width direction.

18. The vehicle body structure according to claim 14, comprising a floor frame extending along a front-rear direction and coupled to the floor cross member, wherein the floor frame, the upper cross member, and the lower cross member are connected in the up-down direction via a coupling member.

19. The vehicle body structure according to claim 14, wherein there are at least two rows in which a plurality of the batteries are arranged along the vehicle width direction; and the upper cross member and the lower cross member are arranged between each row of the batteries.

20. The vehicle body structure according to claim 1, wherein a plurality of the batteries are arranged longitudinally with a longitudinal direction of the battery oriented along a front-rear direction to constitute a battery pack; and a gravity center position of the battery pack is located at a rear of a vehicle gravity center position of an entire vehicle.

\* \* \* \* \*